United States Patent
Li et al.

(10) Patent No.: US 12,297,151 B2
(45) Date of Patent: May 13, 2025

(54) GYPSUM BOARD FROM GYPSUM HAVING HIGH LEVEL OF CHLORIDE SALT AND A POLYMER LAYER AND METHODS ASSOCIATED THEREWITH

(71) Applicant: KNAUF GIPS KG, Iphofen (DE)

(72) Inventors: Qinghua Li, Rolling Meadows, IL (US); Rafael Bury, Wheeling, IL (US)

(73) Assignee: KNAUF GIPS KG, Iphofen (DE)

( * ) Notice: Subject to any disclaimer, the term of this patent is extended or adjusted under 35 U.S.C. 154(b) by 325 days.

(21) Appl. No.: 18/158,088

(22) Filed: Jan. 23, 2023

(65) Prior Publication Data

US 2023/0357085 A1    Nov. 9, 2023

Related U.S. Application Data

(60) Provisional application No. 63/364,164, filed on May 4, 2022.

(51) Int. Cl.
*C04B 28/14* (2006.01)
*B32B 13/08* (2006.01)
(Continued)

(52) U.S. Cl.
CPC .............. *C04B 28/14* (2013.01); *B32B 13/08* (2013.01); *B32B 37/15* (2013.01); *B32B 37/24* (2013.01);
(Continued)

(58) Field of Classification Search
CPC ....... C04B 22/124; C04B 22/16; C04B 28/14; E04C 2/043; B32B 13/08; B32B 37/15
See application file for complete search history.

(56) References Cited

U.S. PATENT DOCUMENTS

| | | | |
|---|---|---|---|
| 3,839,141 A | 10/1974 | McKinnon | |
| 6,001,496 A * | 12/1999 | O'Haver-Smith | ...... B32B 13/14 52/408 |

(Continued)

FOREIGN PATENT DOCUMENTS

| | | |
|---|---|---|
| CN | 111606665 A | 9/2020 |
| WO | 02058902 A2 | 8/2002 |
| WO | 2021133463 A1 | 7/2021 |

OTHER PUBLICATIONS

International Search Report and Written Opinion of the International Searching Authority mailed Jul. 18, 2023 to United States Gypsum Company for International Application No. PCT/US2023/020411 filed Apr. 28, 2023.

(Continued)

*Primary Examiner* — Paola Agudelo
(74) *Attorney, Agent, or Firm* — Vorys, Sater, Seymour and Pease LLP; Paradip Sahu; Philip T. Petti

(57) ABSTRACT

Gypsum boards formed from synthetic gypsum and other gypsum sources having high chloride salt concentrations. Gypsum boards may include a board core including set gypsum between a front cover sheet and a back cover sheet. A total concentration of the chloride anion in the board core ranges from about 150 to 4000 parts by weight (pbw) chloride, typically about 300 to about 3000 pbw, more typically from about 400 to about 2000 pbw, further typically from about 1000 to about 2000 pbw, and further typically from about 600 to about 1000 pbw, per 1,000,000 pbw calcium sulfate dihydrate. A polymer layer contacts an inner surface of the back cover sheet. A densified gypsum layer contacts an inner surface of the front cover sheet. Methods of making the gypsum board, and a wall system for employing the gypsum boards, are also provided.

20 Claims, 3 Drawing Sheets

(51) Int. Cl.
| | |
|---|---|
| B32B 37/15 | (2006.01) |
| B32B 37/24 | (2006.01) |
| C04B 22/12 | (2006.01) |
| C04B 22/16 | (2006.01) |
| C04B 24/38 | (2006.01) |
| D21H 19/12 | (2006.01) |
| E04C 2/04 | (2006.01) |
| C04B 103/10 | (2006.01) |
| C04B 111/00 | (2006.01) |

(52) U.S. Cl.
CPC ............ *C04B 22/124* (2013.01); *C04B 22/16* (2013.01); *C04B 24/38* (2013.01); *D21H 19/12* (2013.01); *E04C 2/043* (2013.01); *B32B 2037/243* (2013.01); *B32B 2250/03* (2013.01); *B32B 2250/40* (2013.01); *B32B 2255/12* (2013.01); *B32B 2255/26* (2013.01); *B32B 2317/12* (2013.01); *B32B 2318/00* (2013.01); *B32B 2607/00* (2013.01); *C04B 2103/10* (2013.01); *C04B 2111/0062* (2013.01)

(56) References Cited

U.S. PATENT DOCUMENTS

| | | | |
|---|---|---|---|
| 8,142,914 | B2 | 3/2012 | Yu et al. |
| 8,404,365 | B2 | 3/2013 | Burdick |
| 9,945,119 | B2 | 4/2018 | Aldabaibeh et al. |
| 10,344,478 | B2 | 7/2019 | Foster et al. |
| 11,186,067 | B2 | 11/2021 | Li et al. |
| 11,560,714 | B2 * | 1/2023 | Sinha Ray ............... E04C 2/26 |
| 11,813,833 | B2 * | 11/2023 | Grant ..................... B32B 5/022 |
| 2002/0153110 | A1 * | 10/2002 | Yamaguchi ............ D21H 27/30 162/146 |
| 2015/0064488 | A1 | 3/2015 | Foster et al. |
| 2017/0246838 | A1 | 8/2017 | Rohlf |
| 2018/0030729 | A1 | 2/2018 | Aldabaibeh et al. |
| 2018/0080226 | A1 | 3/2018 | Lu et al. |
| 2019/0093354 | A1 * | 3/2019 | Dimitrakopoulos .... B32B 38/04 |
| 2020/0055277 | A1 * | 2/2020 | Hemphill ................ C04B 28/14 |
| 2020/0055278 | A1 * | 2/2020 | Li ........................ C04B 28/142 |
| 2021/0129490 | A1 * | 5/2021 | Li ............................. B32B 9/02 |
| 2021/0180322 | A1 * | 6/2021 | Busche .................... B32B 5/18 |
| 2021/0187925 | A1 * | 6/2021 | Hill ........................ B32B 15/08 |
| 2021/0198148 | A1 | 7/2021 | Li et al. |
| 2021/0238096 | A1 * | 8/2021 | Li ........................... C04B 28/14 |
| 2022/0001572 | A1 * | 1/2022 | Clement .................. B05D 7/58 |

OTHER PUBLICATIONS

Burrows, Brian W., "A Decade's Experience of Gypsum Board Weight Reduction int eh U.S.", 14 Inernationale Baustoftagung (Weimar, Sep. 20-23, 2000), pp. 1.0197-1.0207.

"HP 42-1942 Safety Data Sheet", according to the Hazard Communication Standard (CFR29 1910.1200) HazCom 2012 and the Hazardous Products Regulations (HPR) WHIMSI 2015, Version 1.0, Sep. 11, 2017, 9 pages.

Keddie, Joseph, L., et al., "Surfactant Distribution in Latex Films", Fundamentals of Latex Film Formations, (2010), 28 pages in chapter, (19 pages).

Madaeni, Sayed Siavash, et al., "Characterization of polystyrene latexes", Polymer International, 49, (2000), pp. 1356-1364.

Madl, Alexander, "Emulsion Polymers Selection for Paints and Coatings", URL:<https://coatings.specialchem.com/selection-guide/emulsion-polymers-selection-for-paints-and-coatings>, retrieved from the Internet Apr. 5, 2022, 12 pages.

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto Canada, May 2000, pp. 9-1-9-16.

Soula, Oliver, et al., "Styrenic Surfmers in Emulsion Polymerization of Acrylic Monomers. 3. Surface Analysis", Macromolecules, 32, (1999) pp. 6938-6943.

The Dow Chemical Company (Dow), "Rhoplextm AC-1034 Emulsion", Form 884-01213-0819-NAR-EN, Aug. 2019, 2 pages.

* cited by examiner

GYPSUM BOARD FROM GYPSUM HAVING HIGH LEVEL OF CHLORIDE SALT AND A POLYMER LAYER AND METHODS ASSOCIATED THEREWITH

FIELD OF THE INVENTION

The present invention relates to gypsum board formed from synthetic gypsum and other gypsum sources having high chloride salt concentrations. The present invention also provides a method of preparing the gypsum board with a polymer layer to improve adhesion of a gypsum board core to a paper cover sheet relative to a gypsum board without the polymer layer, and a wall system for employing the gypsum board.

BACKGROUND OF THE INVENTION

In the construction of buildings, one of the more common building elements for construction and remodeling is gypsum wallboard, often known as drywall, gypsum boards, gypsum panels, gypsum paneling, and ceiling tiles. In chemical terms, gypsum is calcium sulfate dihydrate ($CaSO_4 \cdot 2H_2O$).

Set gypsum (calcium sulfate dihydrate) is a well-known material that is used in such products. Panels containing set gypsum are often referred to as gypsum boards, which contain a board core (set gypsum core) sandwiched between two cover sheets, particularly paper cover sheets. Such panels are commonly used in drywall construction of the interior walls and ceilings of buildings. A high-density region layer, often referred to as "skim coat," may be included as a layer on the face side of the board core. The high-density region is generally contiguous with a less dense region of the gypsum layer which provides the majority of the gypsum core layer of the gypsum board.

During manufacture of a gypsum board, the stucco (containing calcium sulfate hemihydrate), water, and other ingredients as appropriate may be mixed, typically in a mixer to form an aqueous gypsum slurry. The terms of art aqueous gypsum slurry or aqueous slurry or gypsum slurry are typically employed for the slurry both before and after the calcium sulfate hemihydrate converts to calcium sulfate dihydrate. The gypsum slurry is formed and discharged from the mixer onto a moving conveyor carrying a first cover sheet, optionally bearing a high density layer coat. If present, the high density layer coat is applied upstream from the location where the gypsum slurry is discharged onto the first cover sheet. After applying the gypsum slurry to the first cover sheet, a second cover sheet, again optionally bearing a high density layer coat, is applied onto the gypsum slurry to form a sandwich assembly having a desired thickness. A forming plate, roller or the like may aid in setting the desired thickness. The gypsum slurry is then allowed to harden by forming set (i.e., rehydrated) gypsum through a reaction between the calcined gypsum and water to form a matrix of crystalline hydrated gypsum (i.e., calcium sulfate dihydrate, also known as set gypsum). The desired hydration of the calcined gypsum promotes formation of an interlocking matrix of set gypsum crystals, thereby imparting strength to the gypsum board. Heat may be applied (e.g., using a kiln) to drive off the remaining free (i.e., unreacted) water to yield a dry product. Then the set gypsum product is cut to form gypsum boards having a desired length.

Gypsum (calcium sulfate dihydrate and any impurities) suitable for use in wallboard may be obtained from both natural sources and synthetic sources, followed by further processing.

Natural gypsum may be used by calcining its calcium sulfate dihydrate to produce the hemihydrate form. Gypsum from natural sources is a naturally occurring mineral and can be mined in rock form. Naturally occurring Gypsum is a mineral that is typically found in old salt-lake beds, volcanic deposits, and clay beds. When it is mined, raw gypsum is generally found in the dihydrate form Gypsum is also known as calcium sulfate dihydrate, terra alba or landplaster. This material is also produced as a by-product in various industrial processes. For example, synthetic gypsum is a byproduct of flue gas desulfurization processes from power plants. In gypsum, there are approximately two molecules of water associated with each molecule of calcium sulfate.

Plaster of Paris is also known as calcined gypsum, stucco, calcium sulfate semihydrate, calcium sulfate half-hydrate or calcium sulfate hemihydrate.

When calcium sulfate dihydrate from either source is heated sufficiently, in a process called calcining or calcination, the water of hydration is at least partially driven off and there can be formed either calcium sulfate hemihydrate ($CaSO_4 \cdot \frac{1}{2}H_2O$) (typically provided in the material commonly referred to as "stucco") or calcium sulfate anhydrite ($CaSO_4$) depending on the temperature and duration of exposure. As used herein, the terms "stucco" and "calcined gypsum" refer to both the hemihydrate and anhydrite forms of calcium sulfate that may be contained therein. Calcination of the gypsum to produce the hemihydrate form takes place by the following equation:

$$CaSO_4 \cdot 2H_2O \rightarrow CaSO_4 \cdot 0.5H_2O + 1.5H_2O$$

Calcined gypsum is capable of reacting with water to form calcium sulfate dihydrate, which is a rigid product and is referred to herein as "set gypsum."

Gypsum may also be obtained synthetically (referred to as "syngyp" in the art) as a by-product of industrial processes such as flue gas desulfurization from power plants, for example. Natural or synthetic gypsum can be calcined at high temperatures, typically above 150° C., to form stucco (i.e., calcined gypsum in the form of calcium sulfate hemihydrate and/or calcium sulfate anhydrite), which may undergo subsequent rehydration to form set gypsum in a desired shape, such as a board.

Synthetic gypsum obtained from power plants is usually suitable for use in gypsum panels intended for construction projects. Synthetic gypsum is a byproduct of flue gas desulfurization processes from power plants (also known as desulphurisation gypsum or desulphogyspum or DSG). In particular, flue gas including sulfur dioxide is wet scrubbed with lime or limestone, which produces calcium sulfite in the following reaction.

$$CaCO_3 + SO_2 \rightarrow CaSO_3 + CO_2$$

The calcium sulfite is then converted to calcium sulfate in the following reaction.

$$CaSO_3 + 2H_2O + \frac{1}{2}O_2 \rightarrow CaSO_4 \cdot 2H_2O$$

The hemihydrate form may then be produced by calcination in a similar manner to that used for natural gypsum.

However, many conventional coal-fired power plants are being shut down in favor of more environmentally friendly sources of energy. The shutdown of coal-fired power plants has created a growing shortage of synthetic gypsum suitable for producing gypsum panels. Lower quality synthetic gypsum is available from power plants and other sources, but this alternatively sourced gypsum often contains fairly high concentrations of extraneous salts, particularly magnesium or sodium salts, more particularly magnesium chloride and sodium chloride. Small amounts of potassium chloride and calcium chloride may also be present in alternatively sourced synthetic gypsum. The extraneous salts can be problematic due to their tendency to decrease adhesion between the board core and the cover sheets, particularly a back paper cover sheet. The back paper cover sheet is generally placed above the gypsum slurry deposited during gypsum board manufacture. Thus, the back paper cover sheet is more susceptible to decreased adhesion than the front paper cover sheet.

U.S. Pat. No. 10,344,478 to Foster et al discloses an adhesive binder composition for adhering a paper sheet to a gypsum article with a gypsum layer having at least one paper sheet on a major surface thereof. The adhesive binder composition includes a polymeric adhesive and at least one surfactant. The adhesive binder composition resides at a boundary between the gypsum layer and the paper sheet. A variety of polymers may be employed in the adhesive binder composition, including latex polymers, water-dispersible polymers, water-reducible polymers, and oil modified polymers. Suitable latex polymers are typically stabilized using one or more nonionic or anionic emulsifiers (viz., surfactants) used alone or together. In some embodiments, aqueous emulsions such as acrylics, styrene acrylics, and vinyl acrylics are employed as the adhesive binder compositions. The adhesive binder composition further preferably includes at least one surfactant, U.S. Pat. No. 8,404,365 to Burdick discloses a surface of paper sheet treated with an adhesive comprising water and latex binder. The surface treatment adhesive may preferably also include mineral filler.

US 2017/0246838 to Rohlf discloses a wallboard panel comprising a gypsum core sandwiched between two paper cover sheets, each paper cover sheet in contact with and covering the gypsum core, with the surface of each paper cover sheet proximate to the gypsum core and covering the gypsum core referred to as "the bond side," and in which the bond side of at least one paper cover sheet is coated with an adhesive selected from polyacrylate, polyvinyl acetate, polyvinyl acetate in combination with borax, polyurethane, or any combination thereof.

U.S. Pat. No. 9,945,119 to Aldabaibeh et al discloses methods for making a gypsum board provided with a latex polymer coating layer having a sufficiently low glass transition temperature, a less dense layer gypsum core layer, and a relatively denser layer of gypsum between the less dense gypsum core layer and the latex polymer coating layer and a gypsum board made by the method.

US 2020/0055277 to Hemphill et al discloses gypsum boards formed from synthetic gypsum and other gypsum sources having high chloride salt concentrations. The gypsum boards include a set core between front and back paper cover sheets. The back paper cover sheet has a plurality of perforations extending therethrough. Methods of making the gypsum boards, and a wall system for employing the gypsum boards, are also provided. The concentration of the chloride anion in aqueous gypsum slurry used to make the set core and to perform the methods of the invention may range from about 500 ppm to about 3000 ppm by weight calcium sulfate hemihydrate, typically from about 500 ppm to about 2000 ppm by weight calcium sulfate hemihydrate, more typically from about 500 ppm to about 1500 ppm by weight calcium sulfate hemihydrate It will be appreciated that this background description has been created by the inventors to aid the reader, and is neither a reference to prior art nor an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

The invention relates to gypsum boards having significant adhesion between the board core and one or more of the paper cover sheets, even when appreciable quantities of extraneous salts are present, particularly chloride salts, and more particularly NaCl, KCl, $MgCl_2$ and/or $CaCl_2$. Methods for producing the gypsum boards from salt-containing gypsum sources, particularly low-quality synthetic gypsum, are provided. Improved adhesion between the board core and the paper cover sheets may be realized by providing a polymer layer coated on an inner surface of a back paper cover sheet and a densified gypsum layer on an inner surface of a front cover sheet.

Thus, in one aspect, the invention provides gypsum boards comprising a board core comprising set gypsum. Typically it also includes one or more chloride salts such as NaCl, KCl, $MgCl_2$, or $CaCl_2$, or any combination thereof.

In particular the invention provides a gypsum board comprising:
  a board core layer comprising set gypsum,
  a front paper cover sheet having an outer surface and an inner surface, the inner surface contacting a first face of the board core; and
  a back paper cover sheet having an outer surface and an inner surface, the inner surface facing a second face of the board core;
  wherein the inner surface of the back paper cover sheet is coated with a polymer layer, wherein the polymer layer contacts the second face of the board core,
  wherein about 0.2-about 3.0 lbs/msf, preferably about 1-about 2 lbs/msf, of the polymer layer is on the back paper cover sheet,
  wherein the polymer layer comprises polymer selected from acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, preferably the polymer has a glass transition temperature (Tg) of $-10°$ C. to about $30°$ C.;
  wherein the inner surface of the front paper cover sheet is not coated with a polymer layer, wherein no polymer layer contacts the first face of the board core,
  wherein the polymer of the polymer layer does not penetrate through the back cover sheet to the outer surface of the back cover sheet,
  wherein the core layer is between the first cover sheet and the second cover sheet,
  wherein the board core comprises a low-density region and a high-density region, the high-density region being interposed as a layer between the low-density region and the front paper cover sheet, the high-density region having a higher density than the low-density region, wherein there is an absence of a high-density region between the low-density region and the back cover sheet.

wherein the core layer resulted from setting, between the front paper cover sheet and the back paper cover sheet, an aqueous slurry comprising a mixture of water and stucco, wherein the stucco comprises calcium sulfate hemihydrate, wherein the aqueous slurry comprises:

at least 60 weight percent said calcium sulfate hemihydrate on a dry basis, about 150 to 4000 parts by weight chloride, typically about 300 to about 3000 parts by weight, more typically from about 400 to about 2000 parts by weight, further typically from about 1000 to about 2000 parts by weight, and further typically from about 600 to about 1000 parts by weight, per 1,000,000 parts by weight said calcium sulfate hemihydrate, and said water at a weight ratio of water to the calcium sulfate hemihydrate of 0.2:1 to 1.2:1.

At glass transition temperature polymer molecules transit from glass to rubbery state. All polymers with amorphous regions have a glass transition temperature. For purposes of this description glass transition temperature is Tg determined by using the energy release on heating in differential scanning calorimetry (DSC). Typically, the sample is first cooled with a speed of 10° K/min and then heated with that same speed. Equivalent methods to determine $T_g$ may also be employed.

The inner surface of a front paper cover sheet having an outer surface and an inner surface contacts a first face of the board core. The inner surface of a back paper cover sheet having an outer surface and an inner surface contacts a second face of the board core. The inner surface of the back paper cover sheet is coated with a polymer layer. More particularly, the outer surface of the back paper cover sheet may be attached to a wall once the gypsum board has been installed, and the outer surface of the front paper cover sheet may face outwardly from the wall once the gypsum board has been installed. One or both of the cover sheets may comprise a paper cover sheet, which may be the same or different paper materials.

The calcium sulfate hemihydrate is present in the deposited aqueous slurry of the invention in amounts of at least 60 weight % of the dry (water free) of the aqueous slurry. Preferably the calcium sulfate hemihydrate is at least 70 weight percent of the dry (water free) materials of the aqueous slurry, more preferably at least 80 weight % of the dry (water free) materials of the aqueous slurry, furthermore preferably at least 90 weight % of the dry (water free) materials of the aqueous slurry. In typical wallboard formulations of the invention the dry (water free) materials of the aqueous slurry has at least 90 weight percent or at least 95 weight % calcium sulfate hemihydrate. Use of calcium sulfate anhydrite is also contemplated, although it is preferably used in small amounts of less than 20 weight % of the dry (water free) materials of the aqueous slurry.

Likewise, calcium sulfate dihydrate is present in the board core layer of the gypsum board of the invention and results from setting the aqueous slurry. The calcium sulfate dihydrate is at least 60 wt. % of the board core layer, preferably at least 70 wt. %, and more preferably at least 80 wt. %. Typical wallboard board core layers have at least 90 wt. % or at least 95 wt. % calcium sulfate dihydrate.

In one or more other aspects of the invention, the invention provides methods for preparing a gypsum board having significant quantities of one or more extraneous salts in a board core. The gypsum boards may exhibit significant adhesion between the board core layer and a back paper cover sheet, even when the one or more extraneous salts are present. The method prepares the gypsum board with a polymer layer to improve adhesion of the gypsum board core to the cover sheet relative to a gypsum board without the polymer layer.

In its method respects the invention provides a method of making a gypsum board comprising:

preparing an aqueous gypsum slurry comprising a mixture of water and stucco, wherein the stucco comprises calcium sulfate hemihydrate, wherein the aqueous slurry comprises a mixture of:

at least 60 wt. %, preferably at least 70 wt. %, more preferably at least 80 wt. %, typically at least 90 wt. % or typically at least 95 wt. % said calcium sulfate hemihydrate on a dry (water free) basis, 150 to 4000 parts by weight chloride anion, typically about 300 to about 3000 parts by weight, more typically from about 400 to about 2000 parts by weight, further typically from about 1000 to about 2000 parts by weight, and further typically from about 600 to about 1000 parts by weight, per 1,000,000 parts by weight said calcium sulfate hemihydrate, and the water at a weight ratio of water to the calcium sulfate hemihydrate of 0.2:1 to 1.2:1; and depositing a front paper cover sheet, depositing the aqueous gypsum slurry over the front paper cover sheet to form a layer of the aqueous gypsum slurry, wherein a side of the layer of aqueous gypsum slurry faces an inner surface of the front paper cover sheet, applying an aqueous mixture comprising polymer and water to an inner surface of a back paper cover sheet to result in about 0.2-about 3.0 lbs/msf, preferably about 1-about 2 lbs/msf, of a polymer-containing coating, on a dry (water-free) basis, to the inner surface of the back paper cover sheet, and then depositing the coated back cover sheet over the aqueous gypsum slurry, wherein the aqueous gypsum slurry contacts the polymer layer;

wherein the polymer is selected from acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, preferably the polymer has a glass transition temperature ($T_g$) of −10° C. to about 30° C., wherein the polymer of the polymer layer does not penetrate through the back cover sheet to the outer surface of the back cover sheet, wherein the inner surface of the front paper cover sheet is not coated with a polymer layer, wherein a first portion of the gypsum slurry is disposed in an unfoamed state as a high-density region in layer form contacting the front paper cover sheet and a second portion of the gypsum slurry is disposed in a foamed state as a low-density region contacting the high-density region, the high-density region having a higher density than the low-density region, setting the calcium sulfate hemihydrate to form a panel comprising a gypsum core comprising calcium sulfate dihydrate, wherein the board core comprises a set low-density region comprising calcium sulfate dihydrate and a set high-density region comprising calcium sulfate dihydrate, the set high-density region being interposed as a layer between the set low-density region and the front paper cover sheet, wherein there is an absence of a high-density region comprising calcium sulfate dihydrate between the low-density region and the back cover sheet; and drying the panel and cutting the panel into a gypsum board having one or more pre-determined dimensions.

The stucco particles containing calcium sulfate hemihydrate used to make gypsum board may have about 500 ppm to about 3000 ppm, typically from about 1000 to about 3000 ppm, more typically from about 2000 ppm to about 3000 ppm, chloride anions by weight of calcium sulfate hemihydrate. This means there is about 500 to about 3000 parts by weight, typically about 1000 to about 3000 parts by weight, more typically about 2000 to about 3000 parts by weight chloride anions present for 1,000,000 parts by weight calcium sulfate hemihydrate. In other words, the stucco particles containing calcium sulfate hemihydrate used to make gypsum board may have 500 to about 3000 parts by weight, typically about 1000 to about 3000 parts by weight, more typically about 2000 to about 3000 parts by weight per 1,000,000 parts by weight said calcium sulfate hemihydrate on a dry basis.

The concentration of the chloride anion in the aqueous slurry used to make gypsum board products of the invention and to perform methods of the invention may range from about 500 ppm to about 3000 ppm, typically from about 1000 ppm to about 3000 ppm, more typically from about 2000 ppm to about 3000 ppm relative to weight of the calcium sulfate hemihydrate feed. In other words, in the aqueous slurry may have 500 to about 3000 parts by weight, typically about 1000 to about 3000 parts by weight, more typically about 2000 to about 3000 parts by weight chloride anion per 1,000,000 parts by weight calcium sulfate hemihydrate on a dry (free of water) basis.

The chloride anion in the aqueous slurry used for products and methods of the invention may arise from any source. Generally, the one or more chloride salts are present in the gypsum source used to form the board core of the invention. The gypsum source may be a synthetic gypsum source, particularly a low-quality synthetic gypsum obtained from a power plant flue gas stream. Thus, generally the source of the chloride anion is the one or more chloride salts in the stucco used to make the aqueous slurry. The chloride anions are derived from the chloride atoms of the one or more chloride salts in the stucco when the stucco is used in the aqueous slurries. Typically, the one or more chloride salts are any of NaCl, KCl, $MgCl_2$, $CaCl_2$, or any combination thereof. However, the chloride anions may also arise from impurities, such as one or more chloride salts, in water used to make the gypsum slurry Typically, the aqueous gypsum slurry dry (water free) components used for products and methods of the invention, and as a result the board core has less than 10 wt. %, more typically an absence of, Portland cement or other hydraulic cement or any combination thereof. Typically, the aqueous slurry dry (water free) components, and as a result the board core has less than 10 wt. %, more typically an absence of, fly ash. Typically, the aqueous slurry dry (water free) components, and as a result the board core has less than 10 wt. %, more typically an absence of, calcium carbonate.

For purposes of this disclosure a dry basis is a water free basis. A wet basis is a water inclusive basis.

All average molecular weights, percentages and ratios used herein, are by weight (i.e., wt. %) unless otherwise indicated.

In one or more other aspects of the invention, the invention provides a wall system comprising framing to which is attached at least one gypsum board of the invention, wherein the outer surface of the front paper cover sheet faces away from the framing. In this wall system, the gypsum board may be on an interior wall or ceiling of a building. Typically, the framing is wood or metal. Typically the at least one gypsum board is attached to the framing by any one or more of screws, nails, glue, or other mechanical fasteners.

Advantages of the present invention may become apparent to those having ordinary skill in the art from a review of the following detailed description, taken in conjunction with the examples, and the appended claims. It should be noted, however, that while the invention is susceptible of various forms, the present disclosure is intended as illustrative, and is not intended to limit the invention.

DETAILED DESCRIPTION OF THE INVENTION

Figure 1:
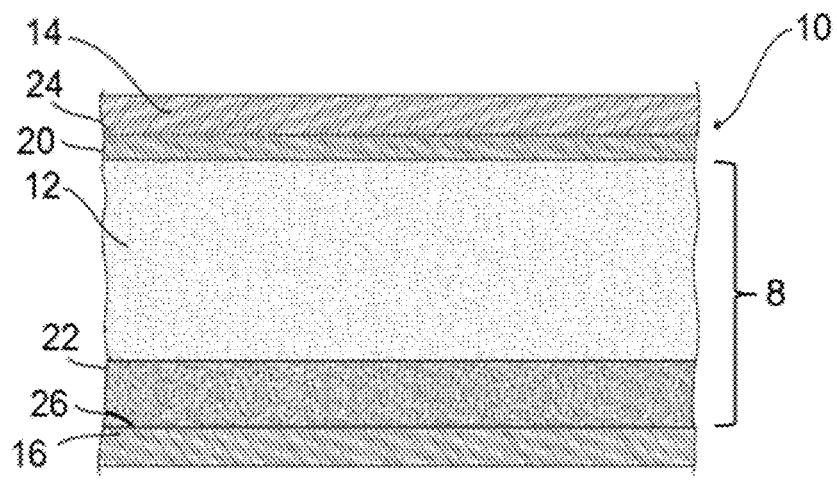
FIG. 1 shows a cross-sectional view of a gypsum board of the invention, in which a board core (gypsum core) is sandwiched between a front paper cover sheet and a back paper cover sheet, the back paper cover sheet coated with a polymer layer.

The present invention provides the ability to use gypsum containing relatively high amounts of extraneous salts in the board core of a gypsum board. Under ordinary circumstances, high salt concentrations in the board core may result in insufficient adhesion between the board core and at least one of the front paper cover sheet and the back cover sheet, particularly the back cover sheet.

Surprisingly, a polymer layer disposed on the inner surface of the back cover sheet can improve adhesion to a board core made from aqueous slurry of stucco containing calcium sulfate hemihydrate and high amounts of extraneous salts. Preferably the polymer layer is a continuous polymer layer disposed upon the entire inner surface of the back cover sheet. One or both of the cover sheets may be paper cover sheets, which may be the same or different paper materials. Optionally, starch and/or other additives may be present in the board core or aqueous gypsum slurry used to form the board core.

The board core comprises a less dense region (layer) and further comprise a high-density region (layer) in contact with the inner surface of the front paper cover sheet.

For purposes of this description, the word high in the term high-density region means having a density higher than the density of the low-density region. The word low in the term low-density region means having a density lower than the density of the high-density region. Typically the high-density region is not foamed. Typically the low-density region is foamed. This description also refers to the high-density region as a densified layer or a thin dense layer.

When the polymer layer is present in combination with a board core containing high amounts of extraneous salts, any of these boards may benefit from improved adhesion between the board core and the back cover sheet, relative to a board which is the same but for lacking the polymer layer.

Accordingly, the present invention provides gypsum boards containing significant quantities of extraneous salts in a board core and methods for producing such gypsum boards using a gypsum source containing significant quantities of the extraneous salts. Thus, a polymer layer coated upon the back paper cover sheet may allow lower quality gypsum sources containing excessive extraneous salts to be used in forming a gypsum board. Such gypsum sources may otherwise be unsuitable for forming a gypsum board with sufficient adhesion between the board core and the cover sheets. Advantageously, the present invention addresses this issue.

Gypsum Board

The present invention provides a gypsum board comprising:
- a board core layer comprising set gypsum,
- a front paper cover sheet having an outer surface and an inner surface, the inner surface contacting a first face of the board core; and
- a back paper cover sheet having an outer surface and an inner surface, the inner surface facing a second face of the board core;
- wherein the inner surface of the back paper cover sheet is coated with a polymer layer, wherein the polymer layer contacts the second face of the board core,
- wherein about 0.2-about 3.0 lbs/msf, preferably about 1-about 2 lbs/msf, of the polymer layer is on the back paper cover sheet,
- wherein the polymer layer comprises polymer selected from acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, preferably the polymer has a glass transition temperature ($T_g$) of $-10°$ C. to about $30°$ C.;
- wherein the inner surface of the front paper cover sheet is not coated with a polymer layer, wherein no polymer layer contacts the first face of the board core,
- wherein the polymer of the polymer layer does not penetrate through the back cover sheet to the outer surface of the back cover sheet,
- wherein the core layer is between the first cover sheet and the second cover sheet,
- wherein the board core comprises a low-density region and a high-density region, the high-density region being interposed as a layer between the low-density region and the front paper cover sheet, the high-density region having a higher density than the low-density region,
- wherein there is an absence of a high-density region between the low-density region and the back cover sheet.
- wherein the core layer resulted from setting, between the front paper cover sheet and the back cover sheet, an aqueous slurry comprising a mixture of water and stucco, wherein the stucco comprises calcium sulfate hemihydrate, wherein the aqueous slurry comprises:
  - at least 60 weight percent said calcium sulfate hemihydrate on a dry basis, about 150 to 4000 parts by weight chloride, typically about 300 to about 3000 parts by weight, more typically from about 400 to about 2000 parts by weight, further typically from about 1000 to about 2000 parts by weight, and further typically from about 600 to about 1000 parts by weight, per 1,000,000 parts by weight said calcium sulfate hemihydrate, and said water at a weight ratio of water to the calcium sulfate hemihydrate of 0.2:1 to 1.2:1.

Figure 2:
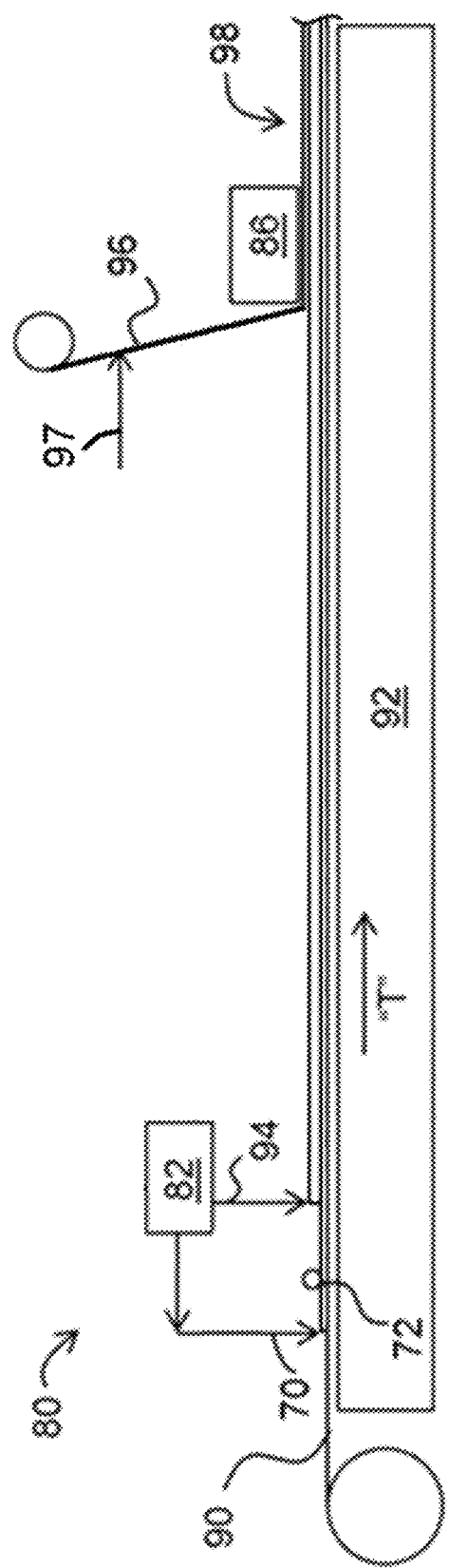
FIG. 2 shows a process flow diagram of a version of the present method.

The present invention uses an aqueous polymer composition to provide a polymer layer upon the core side of the back paper cover sheet of gypsum wallboard prior to casting. The polymer layer provides a localized region having a high-polymer concentration at the bonding interface between the gypsum core and the back paper cover sheet. FIG. 1 depicts an example of a wallboard panel 10 of the invention. FIG. 2 shows a top (axial) view of the wallboard panel 10. The board has a core 8 that comprises a set low-density region (less dense region) 12 as a layer comprising calcium sulfate dihydrate and a set high-density region (thin dense gypsum layer) 22 as a layer comprising calcium sulfate dihydrate.

FIG. 1 depicts the wallboard panel 10 of the invention in which a gypsum low-density region 12 (for example 0.5 inch thick) is sandwiched between a back paper cover sheet 14 (also known as a backer paper cover sheet) and a front paper cover sheet 16 (also known as a facer paper cover sheet), which may each be single-ply or multi-ply paper. The inner surface of the back paper cover sheet 14 creates a bond side 24 of the back paper cover sheet 14 which faces the gypsum core. The inner surface of the front paper cover sheet 16 creates a bond side 26 of the front paper cover sheet 16 which faces the gypsum low-density region 12. The outer surface of the back paper cover sheet 14 faces wall framing (not shown) of a room after the wallboard panel 10 is installed as an interior wall. The outer surface of the front paper cover sheet 16 faces inside of a room after the wallboard panel 10 is installed as an interior wall.

A polymer layer 20 lies on the back sheet 14 bond side. A high-density region (thin dense gypsum layer) 22 lies between the gypsum low-density region (less dense region) 12 and the front paper cover sheet 16 to contact the gypsum low-density region 12 and the front paper cover sheet 16. Generally the gypsum low-density region 12 and the high-density region 22 have the same composition. However, the low-density region slurry has been foamed and the high-density region slurry has not been foamed so it is denser than the low-density region slurry.

The polymer layer is disposed upon the back paper in an amount of about 0.2-about 3.0 lbs/msf, preferably about 1-2 lbs/msf (msf=1000 square feet). The polymer layer 20 surprisingly increases the bonding performance between the gypsum low-density region 12 and the back sheet 14. The improved bonding performance can be particularly evident when the gypsum has a high salt concentration.

The wallboard panel 10 has no thin dense layer of gypsum on the back paper cover sheet 14 bond side 24. The wallboard panel 10 has no polymer layer on the front paper cover sheet 16 bond side 26. Thus, there is a gypsum high-density region layer 22 but no polymer layer on the facer side of the gypsum core and a polymer layer 20 but no thin dense layer of gypsum on the backer side of the gypsum low-density region 12.

The polymer coating composition used in the present invention comprises a polymer as a binder. The aqueous polymer coating composition applied to form the polymer layer is typically applied as a waterborne coating, for example latex polymers, emulsion polymers, water-dispersible polymers, or water-reducible polymers. The waterborne coating is applied as a dilute aqueous polymer solution or dispersion. Typically the aqueous polymer composition when applied is 5 to 30, preferably 10 to 20, wt. % polymer.

The aqueous polymer composition dries and cures with the board during drying of the board in a kiln to form the polymer layer. Upon drying of the diluted polymer solution, the resulting polymer layer typically consists essentially of polymer.

The polymer of the polymer coating is disposed on all of the inner surface of the back paper cover sheet between the back paper cover sheet and the gypsum core. At least a portion of the polymer coating penetrates from the inner surface of the back paper cover sheet through a portion of the back paper sheet but not into the gypsum core.

The high-density region (thin, dense gypsum layer) 22 is applied to an inner surface of a front paper cover sheet 16. Generally the relatively low-density region 12 and relatively high-density region 22 have the same composition and are contiguous with one another. However, the low-density region may be formed from a gypsum slurry in a foamed state, whereas the high-density region may be in formed from a gypsum slurry that is not foamed so that a denser layer forms. That is, the high-density region may have a lower porosity associated therewith than does the low-density region.

One or more chloride salts may be present in board low-density region 12 of the present disclosure and/or its high-density region 22. Generally, the one or more chloride salts include any chloride salts from the stucco or other ingredient used to make the aqueous slurry for making the board.

The concentration of the chloride anion in the aqueous slurry used to make the low-density region 12 and the high-density region 22 may range from about 500 to about 3000 parts by weight, typically from about 1000 to about 3000 parts by weight, more typically from about 2000 to about 3000 parts by weight, per 1,000,000 parts by weight calcium sulfate hemihydrate.

Methods for Manufacture

Various methods can be employed for preparing a gypsum board of the present invention from an aqueous gypsum slurry comprising calcium sulfate hemihydrate and a high amount of chloride salt. However, instead of a conventional gypsum source, a gypsum source containing the one or more chloride salts, as described above, may be substituted in the manufacturing process.

The base material from which gypsum wallboard and other gypsum products are manufactured is the hemihydrate form of calcium sulfate ($CaSO_4 \cdot \frac{1}{2}H_2O$), commonly termed "calcined gypsum" or "stucco," which is produced by heat conversion (calcination) of the dihydrate form of calcium sulfate ($CaSO_4$).

The invention encompasses a method of making a gypsum board comprising:

preparing an aqueous gypsum slurry comprising a mixture of water and stucco, wherein the stucco comprises calcium sulfate hemihydrate, wherein the aqueous slurry comprises a mixture of:
  at least 60 wt. %, preferably at least 70 wt. %, more preferably at least 80 wt. %, typically at least 90 wt. % or typically at least 95 wt. % said calcium sulfate hemihydrate on a dry (water free) basis,
  150 to 4000 parts by weight chloride anion, typically about 300 to about 3000 parts by weight, more typically from about 400 to about 2000 parts by weight, further typically from about 1000 to about 2000 parts by weight, and further typically from about 600 to about 1000 parts by weight, per 1,000,000 parts by weight said calcium sulfate hemihydrate, and
  the water at a weight ratio of water to the calcium sulfate hemihydrate of 0.2:1 to 1.2:1; and depositing a front paper cover sheet, depositing the aqueous gypsum slurry over the front paper cover sheet to form a layer of the aqueous gypsum slurry, wherein a side of the layer of aqueous gypsum slurry faces an inner surface of the front paper cover sheet, applying an aqueous mixture comprising polymer and water to an inner surface of a back paper cover sheet to result in about 0.2-about 3.0 lbs/msf, preferably about 1-about 2 lbs/msf, of a polymer-containing coating, on a dry (water-free) basis, to the inner surface of the back paper cover sheet, and then depositing the coated back cover sheet over the aqueous gypsum slurry, wherein the aqueous gypsum slurry contacts the polymer layer;

wherein the polymer is selected from acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, preferably the polymer has a glass transition temperature ($T_g$) of $-10°$ C. to about $30°$ C., wherein the polymer of the polymer layer does not penetrate through the back cover sheet to the outer surface of the back cover sheet, wherein the inner surface of the front paper cover sheet is not coated with a polymer layer, wherein a first portion of the gypsum slurry is disposed in an unfoamed state as a high-density region in layer form contacting the front paper cover sheet and a second portion of the gypsum slurry is disposed in a foamed state as a low-density region contacting the high-density region, the high-density region having a higher density than the low-density region, setting the calcium sulfate hemihydrate to form a panel comprising a gypsum core comprising calcium sulfate dihydrate, wherein the board core comprises a set low-density region comprising calcium sulfate dihydrate and a set high-density region comprising calcium sulfate dihydrate, the set high-density region being interposed as a layer between the set low-density region and the front paper cover sheet, wherein there is an absence of a high-density region comprising calcium sulfate dihydrate between the low-density region and the back cover sheet; and drying the panel and cutting the panel into a gypsum board having one or more pre-determined dimensions.

The low-density region (e.g., low-density region 12 of FIG. 1) resulting from the set gypsum low-density region slurry generally has a thickness of 0.25 inches to 1.5 inches and a density of 15 to 55 pounds/cubic foot. In contrast, generally the high-density region (e.g., high-density region 22 of FIG. 1) has a thickness of 5% to 25% of the thickness of the gypsum board 10. Typically the densified layer has a thickness of from about 0.02 inches to about 0.2 inches (about 0.05 to about 0.5 cm), for example, from about 0.0625 inch to about 0.125 inch (about 0.16 to about 0.32 cm). The thickness of the low-density region layer 12 is greater than the thickness of the high-density region layer 22. When foamed, the gypsum low-density region layer resulting from the set foamed gypsum slurry has a total void volume of 10 to 92 volume percent, particularly 25 to 90 volume percent, and more particularly 30 to 85 volume percent. In contrast, the densified layer has a total void volume of less than 30 volume percent and is less than 0.25 inches thick.

Illustrative manufacturing techniques and equipment suitable for forming gypsum board according to the present invention can be found, for example, in U.S. Pat. No. 7,364,676 and U.S. Patent Application Publication 2010/0247937, each of which is incorporated herein by reference in its entirety. To produce gypsum board, the stucco is mixed with water and additives to form an aqueous gypsum slurry which is continuously fed between continuous layers of paper on a board machine. One paper cover sheet is called the face cover sheet, or front cover sheet or facer. The other paper cover sheet is called the back cover sheet, or backer.

In an embodiment, to produce gypsum board having front and back paper cover sheets, the stucco is mixed with water and additives to form an aqueous slurry which is continuously fed between continuous layers of paper on a board machine. As the board moves down a conveyer line to form a panel, the calcium sulfate recrystallizes or rehydrates, reverting to its original rock state. The paper becomes bonded to the core as the gypsum sets. The panel is then cut to length and conveyed through dryers to remove any free moisture.

Such processes discharge the first cover sheet onto a moving conveyor. Dry and/or wet components of the aqueous gypsum slurry are fed to a mixer (e.g., a pin or pinless mixer), where they are agitated to form the aqueous gypsum slurry. The aqueous gypsum slurry can be made with any suitable water/calcium sulfate hemihydrate ratio for disposition onto the first cover sheet. Since gypsum board is normally formed "face down," this first cover sheet typically corresponds to the facer (front cover sheet) upon completion of the fabrication process. The mixer comprises a main body and a discharge conduit (e.g., a gate-canister-boot arrangement as known in the art, or an alternative arrangement, such as that described in U.S. Pat. Nos. 6,494,609 and 6,874,930, which are incorporated herein by reference in their entirety). In some process configurations, the discharge conduit may include a slurry distributor with either a single feed inlet or multiple feed inlets, such as those described in U.S. Patent Application Publication 2012/0168527 and 2012/0170403, which are incorporated herein by reference in their entirety. When using a slurry distributor with multiple feed inlets, the discharge conduit can include a suitable flow splitter, such as those described in U.S. Patent Application Publication 2012/0170403. Foaming agent (typically soap) can be added in the discharge conduit of the mixer (e.g., in the gate as described, for example, in U.S. Pat. Nos. 5,683,635 and 6,494,609, which are incorporated herein by reference) or in the main body, if desired. Slurry discharged from the discharge conduit after all ingredients have been added, including foaming agent, is the primary gypsum slurry and is used to form the low-density region layer. This gypsum slurry is discharged onto the moving first cover sheet.

After mixing, the aqueous gypsum slurry optionally has foam added to decrease the product density. Foam is generated by combining soap and water. The foam may then be injected into the aqueous gypsum slurry after it exits from the mixer through a hose or chute. Foam is typically added to the portion of aqueous gypsum slurry for the less dense layer of the core, but not for the portion of slurry for the densified layer.

When the foam and the aqueous gypsum slurry have been brought together, the resulting slurry moves toward and is poured onto a conveyor lined with a first piece of facing material which is the first cover sheet. Another piece of facing material which is the second cover sheet is placed on top of the slurry, forming a sandwich assembly with the slurry between the two facing materials. The sandwich assembly is fed to a forming plate or other forming device, the height of which determines the thickness of the board.

Next the continuous sandwich assembly is cut into appropriate lengths at a cutting knife, usually eight feet to twelve feet. As the board moves down a conveyer line to form a panel the slurry is allowed to harden (set). The calcium sulfate recrystallizes or rehydrates, reverting to its original rock state to form a board core comprising an interlocking crystalline matrix of set gypsum. The cover sheets become bonded to the core as the gypsum sets. The panel is then cut to length and conveyed through kilns or dryers to remove any free moisture. Temperatures in the kiln typically range from 450° F. to 500° F. maximum. A benefit of the invention is that, during manufacture of the gypsum board, the polymer layer assists in the bonding of the back cover sheet to the core without having to add the polymer in the entire core.

As described above, the front cover sheet is in interfacial contact with a high-density region, also known as a densified layer. The densified layer is typically contiguous with the low-density region layer after setting. Where foam is inserted into the discharge conduit, a stream of secondary gypsum slurry can be removed from the mixer body before foaming to provide a slurry for forming the densified layer. The densified layer may be deposited onto the moving second cover sheet before the main portion of the gypsum slurry is deposited for forming the low-density region layer. After being discharged from the discharge conduit, the gypsum slurry for the low-density region is spread, as necessary, over the first cover sheet and the densified layer. At this point, the spread gypsum low-density region slurry is contacted with the second cover sheet, upon which the first densified layer has already been deposited. The resulting wet assembly is in the form of a multi-layer assembly, which is a precursor to the final gypsum board product. The densified layer can be formed from the same or different gypsum slurry as the low-density region layer.

FIG. 2 illustrates an example of a wet end 80 (upstream portion) of a manufacturing production line for producing a layered gypsum board of the present invention having a gypsum layer between two cover sheets, and provided with the densified layer. The cover sheets are, for example, made of paper, for example manila paper or Kraft paper.

The wet end 80 includes a gypsum slurry mixing and dispensing assembly 82 and a forming station 86. A first moving web 90 of first cover sheet material (face sheet) moves in a longitudinal direction of travel "T" along the forming table 92. The gypsum low-density region slurry 94 is mixed in the gypsum slurry mixing and dispensing assembly 82 where additives and foaming of the slurry for the low-density region layer (e.g. layer 12, FIG. 1) occurs. While the gypsum slurry mixing and dispensing assembly 82 is illustrated as a single component of the wet end 80, there can be multiple components that comprise the gypsum slurry mixing and dispensing assembly 82.

A densified layer slurry 70 is applied to the first cover sheet material 90 to form a densified layer (e.g. high-density region 22, FIG. 1) on the first cover sheet material 90, and passes under a first gypsum densified layer roller 72, before depositing the gypsum central low-density region layer slurry 94. An aqueous polymer water mixture is applied to the second cover sheet material (back sheet material) 96 to form a polymer layer (e.g. layer 20, FIG. 1). The second cover sheet material (back sheet material) 96 is then applied on top of the deposited low-density region layer slurry 94 to form a multilayer structure. Then the multilayer structure is passed through the forming station 86 to compress the layers into a desired total thickness. The resultant structure is a gypsum board preform 98.

The gypsum densified layer is relatively denser than the gypsum low-density region layer slurry which may be a foamed gypsum slurry. As is known in the art, the densified layer can be achieved by directing a portion of the slurry out of the mixer and into a densified layer mixer prior to introduction of foam or by beating foam out of the slurry. Thus, the gypsum low-density region layer slurry 94 for the low-density region layer of the board is deposited onto the gypsum densified layer slurry 70.

The cover sheet materials may be uncoated or coated with, for example, a pre-applied outer surface polymer coating and a hydrophobic finish. Typically the outer surface of the applied moving webs 96 and 90 as well as the resulting outer surface of the front and back cover sheets of the gypsum board are uncoated and in contact with no additional layers.

Additional components can be included in the wet end 80 of the manufacturing line. The gypsum densified layer will typically be thinner and denser than the low-density region layer. Typically the calcined gypsum (calcium sulfate hemihydrate) slurry 94 for the low-density region layer is foamed to be less dense than the slurry 70 and the slurry 76 of the densified layers. Thus if desired, calcined gypsum low-density region layer slurry stream 94 may pass through a foamer device (not shown), which for instance mixes the calcined gypsum low-density region layer slurry stream 94 with foam and/or air, prior to deposition on the first cover sheet material 90. Typically the gypsum low-density region layer slurry stream 94 and the slurry stream 70 for the gypsum densified layers have the same composition and density. However if desired, the gypsum low-density region layer slurry stream 94 and the slurry stream for the gypsum densified layer 70 can have different compositions and/or densities. FIG. 2 shows all the gypsum slurries 70, 94 coming from the same calcined gypsum slurry mixing and dispensing assembly 82. However, the calcined gypsum slurries 70, 94 can come from different mixing and dispensing assemblies to have different properties, such as different densities.

The gypsum densified layer roller 72, the forming table 92, the forming station 86 can all comprise conventional equipment suitable for their intended purposes as is known in the art. The wet end 80 can be equipped with other conventional equipment as is known in the art.

The calcined gypsum in the gypsum slurries 70, 94 reacts with the water and sets as a conveyor moves the gypsum board preform 98 down a manufacturing line. The gypsum board preform 98 is dried and cut into segments of predetermined dimensions at a point along the line where the gypsum board preform 98 has set sufficiently. The segments can be dried (e.g., in a kiln) to drive off excess water, and processed to provide the final layered wallboard of desired dimensions.

The forming station 86 is the location in the board line where wet board precursor is sized to a pre-determined width and thickness, and optionally, length. Thus, the forming station includes, or can be, any device capable of performing a final mechanical spreading and/or shaping of the slurry across the width of the backing layer, many of which are known in the art. The forming station comprises a means of conforming the slurry thickness and width to the final desired thickness and width of a wet board precursor that, when set, will produce the cementitious board product. The final desired slurry thickness and width produced at the forming station can, of course, differ from the final thickness and width of the finished board product. For example, the slurry thickness and/or width can expand and/or contract during crystallization (i.e., setting) and drying of the slurry. Typically, the desired slurry thickness is substantially equal to the desired board thickness (e.g., about 0.375" (about 0.95 cm), about 0.5" (about 1.27 cm), about 0.625" (about 1.59 cm), about 0.75" (about 1.90 cm), or about 1" (about 2.54 cm). By way of illustration only, the final board thickness typically is within about + or −⅛" (about 0.32 cm) or less of the final slurry thickness.

The forming station includes any device that is capable of creating the desired slurry thickness and width of the wet board precursor. Suitable devices include, for example, a forming plate, a forming roller, a forming press, a screed, and the like. The particular device used will depend, in part, on the type of cementitious board being produced. In a preferred embodiment, for example when the board forming system is a gypsum board or acoustical panel forming system, the board forming station comprises a forming plate as is known in the art. The board forming system of any of the above embodiments optionally further comprises a blade for cutting wet board precursor or dry cementitious board product to the desired lengths, and/or a drying region capable of removing water from the set cementitious board.

Gypsum and Stucco (Calcined Gypsum)

The calcium sulfate hemihydrate component used to form the crystalline matrix of the gypsum panel core typically comprises beta calcium sulfate hemihydrate, water-soluble calcium sulfate anhydrite, alpha calcium sulfate hemihydrate, or mixtures of any or all of these, and obtained from natural or synthetic sources. The calcium sulfate hemihydrate is typically provided in the raw material known as stucco or calcined gypsum. In some aspects, the stucco may include non-gypsum minerals, such as minor amounts of clays or other components that are associated with the gypsum source or are added during the calcination, processing and/or delivery of the stucco to the mixer. The stucco can be fibrous or non-fibrous. Typically the raw stucco has at least 70 wt. % calcium sulfate hemihydrate, preferably at least 80 wt. % calcium sulfate hemihydrate, more preferably at least 85 wt. % calcium sulfate hemihydrate, and furthermore preferably at least 90 wt. % calcium sulfate hemihydrate.

Chloride Salts

The aqueous gypsum slurry for forming the gypsum board of the invention comprises water and stucco, wherein the aqueous gypsum slurry also contains chloride anions. The chloride anions may arise from one or more chloride salts from any source. Generally, the one or more chloride salts are present in the gypsum source used to form the core of the board of the invention. Thus, all or at least a majority of the one or more chloride salts may be introduced to the gypsum slurry from the source of gypsum that is used. The gypsum source may be a synthetic gypsum source, particularly a low-quality synthetic gypsum obtained from a power plant flue gas stream. Such a low-quality gypsum source may not otherwise be suitable for forming a wall board without using the polymer layer, according to the present invention. The one or more chloride salts may also arise from impurities, such as one or more chloride salts, in water used to make the aqueous gypsum slurry.

Chloride salts are any salts which contain chloride. Thus, they include monovalent salts of chloride anion and a monovalent cation, such as sodium or potassium. Thus, they include divalent salts of chloride anions and a divalent cation, such as calcium or magnesium. Other chloride salts, are also contemplated, such as trivalent salts of chloride anions and a trivalent cation.

The stucco particles containing calcium sulfate hemihydrate used to make gypsum board may have about 150 to 4000 parts by weight chloride, typically about 300 to about 3000 parts by weight, more typically from about 400 to about 2000 parts by weight, further typically from about 1000 to about 2000 parts by weight, and further typically from about 600 to about 1000 parts by weight, per 1,000,000 parts by weight said calcium sulfate hemihydrate.

For example, the stucco particles containing calcium sulfate hemihydrate used to make gypsum board may have about 500 ppm to about 3000 ppm, typically from about 1000 parts by weight to about 3000 parts by weight, more typically from about 2000 parts by weight to about 3000 parts by weight, chloride anions by weight of calcium sulfate hemihydrate.

This means there is about 500 parts by weight to about 3000 parts by weight, typically from about 1000 parts by weight to about 3000 parts by weight, more typically from about 2000 parts by weight to about 3000 parts by weight chloride anions present for 1,000,000 parts by weight calcium sulfate hemihydrate.

In other words, the stucco particles containing calcium sulfate hemihydrate used to make gypsum board may have 500 parts by weight to about 3000 parts by weight, typically from about 1000 parts by weight to about 3000 parts by weight, more typically from about 2000 parts by weight to about 3000 parts by weight chloride ions per 1,000,000 parts by weight said calcium sulfate hemihydrate on a dry basis. A dry basis would be a water free basis. A wet basis would be a water inclusive basis.

The concentration of the chloride anion in the aqueous slurry used to make gypsum board products of the invention and to perform methods of the invention may range from about 150 to 4000 parts by weight chloride, typically about 300 to about 3000 parts by weight, more typically from about 400 to about 2000 parts by weight, further typically from about 1000 to about 2000 parts by weight, and further typically from about 600 to about 1000 parts by weight, per 1,000,000 parts by weight said calcium sulfate hemihydrate.

For example, the concentration of the chloride anion in the aqueous slurry used to make gypsum board products of the invention and to perform methods of the invention may range from about 500 ppm to about 3000 ppm, typically from about 1000 ppm to about 3000 ppm, more typically from about 2000 ppm to about 3000 ppm relative to weight of the calcium sulfate hemihydrate feed. In other words, in the aqueous slurry may have 500 parts by weight to about 3000 parts by weight, typically from about 1000 parts by weight to about 3000 parts by weight, more typically from about 2000 parts by weight to about 3000 parts by weight chloride anion per 1,000,000 parts by weight calcium sulfate hemihydrate on a dry basis.

Polymer

Various polymers can be used for the polymer layer of the invention and, if desired also added to the aqueous gypsum slurry. However, the aqueous gypsum slurry may have an absence of polymer.

The gypsum core is not set by the time the aqueous polymer composition first contacts it.

The polymer layer has an absence of gypsum, inorganic filler, organic and filler. The polymer layer consists essentially of polymer and water.

The polymer layer (for example, polymer layer 20) may be a continuous polymer layer contacting, at least 90% or preferably 100%, of the inner surface of back paper cover sheet 16. A polymer layer 20 that is "continuous" refers to the layer having a substantial lack of discontinuities upon the inner surface of the back paper cover sheet 16. That is, polymer is disposed as layer upon all or nearly all (over 90%) of the back paper cover sheet 16. Alternately, when polymer layer 20 is continuous, no layer patterning is present. Accordingly, suitable methods for applying the polymer layer upon a paper cover sheet may include, for example, spraying, painting, inkjet printing, stenciling, stencil printing, roller coating, dip coating (immersion), or the like. The polymer in polymer layer 20 is wet when contacted with the gypsum slurry. As described below, the gypsum is in a wet state when contacted with polymer layer 20 in order to form a more effective bond thereto. That is, the gypsum slurry is contacted with polymer layer 20 prior to setting of the gypsum to form the board low-density region 12.

The coating composition used in the present invention comprises a polymer as a binder. The polymer is typically applied as a latex. The term latex is known by those skilled in the art to mean an aqueous emulsion of natural or synthetic rubber or plastic (synthetic polymer) globules. That is, water forms the continuous phase of the emulsion and natural or synthetic rubber or film-forming polymers form the discontinuous phase. In particular the polymer is a synthetic latex (i.e., an aqueous dispersion of polymer particles prepared by emulsion polymerization of one or more monomers).

The polymer of the polymer coating is disposed on all of the inner surface of the back paper sheet between the back paper sheet and the gypsum core, wherein at least a portion of the polymer coating penetrates from the inner surface of the back paper sheet through a portion of the face paper sheet but not into the gypsum core.

The polymer coating comprises an aqueous emulsion or dispersion comprising water and polymer selected from the group consisting of acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof. Preferably the polymer coating has an absence of ethylene vinyl acetate. Preferably the polymer coating has an absence of hydroxyethyl cellulose.

Typically the polymer is a synthetic latex (i.e., an aqueous dispersion of polymer particles prepared by emulsion polymerization of one or more monomers). The polymer coating comprises an aqueous emulsion or dispersion comprising water, latex polymer selected from the group consisting of acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, and surfactant. Preferably the latex binder has an absence of ethylene vinyl acetate and/or hydroxyethyl cellulose.

Preferably the polymer is selected from styrene-butadiene latex, styrene acrylic polymer or acrylic ester polymer.

Typically, the polymer glass transition temperature is in the range from about −10° C. to about 30° C., and more preferably from about 5 to about 30° C., and more preferably from about 10 to about 20° C.

The polymer in the polymer layer(s) is generally a non-migrating polymer. In this respect, migratory polymers are different than the polymers present in the polymer layer(s) and are known in the art as having smaller molecular chains. These smaller chained migratory polymers can generally migrate within a gypsum slurry but are not beneficial for enhancing board strength. Migratory polymers have molecular weights that are typically below about 6,000 Daltons. Typically polymers for incorporation within the polymer layer in of the invention have higher molecular weights than migratory polymers, e.g., at least about 15,000 Daltons, or at least about 30,000 Daltons. The average molecular weight may be indicated by the peak viscosity.

Any suitable amount of polymer may be present in the polymer layer of the board. For example, the polymer layer may include an amount of polymer ranging from, for example, about 0.2 lbs/MSF (MSF=1000 square feet) to about 3.0 lbs/MSF, such as from about 1 lb/MSF to about 2 lbs/MSF. Typically, the waterborne coating and resulting polymer layer in the gypsum boards of the invention have an absence of gypsum, inorganic filler, organic filler, starches, and combinations thereof.

The waterborne coating and resulting polymer layer also has an absence of added surfactant. Emulsion Polymers can be defined as dispersions of polymeric particles of about 100-1000 nm size in an aqueous dispersion media. They are polymer dispersions, by technical terms, and often also referred to as "polymer emulsions", "dispersions" or "polymer latex". A polymer coating composition that is a latex composition or an emulsion polymer composition may contain an emulsifier, that may be categorized as a surfactant, to stabilize the composition. The waterborne coating may have less than 2.10, or less than 2, or less than 1.8, or less than 1.5, or less than 1, or less than 0.5, or less than 0.1, or 0 parts by weight surfactant per 100 parts by weight polymer. Except for this emulsifier, that may be present when the waterborne coating is applied as a latex composition or an emulsion polymer composition, the waterborne coating has a substantial absence, for example, less than 1 or less than 0.5 or less than 0.1 parts by weight any other surfactant (added surfactant) per 100 parts by weight waterborne coating, or an absence of any other surfactant. The aqueous polymer solution or dispersion may consist essentially of polymer and water. The aqueous polymer solution or dispersion may consist of polymer and water. Typically the polymer layer results from drying and/or curing of an aqueous polymer composition consisting essentially of a latex or emulsion polymer, or consisting of a latex or emulsion polymer. Consisting essentially of means there is no added surfactant. In other words, the latex composition or emulsion polymer is applied as is with no extra surfactant. The waterborne coating and resulting polymer layer may have an absence of surfactant.

Additives

Other additives that may be present in the gypsum slurry used to form the board core may include, but are not limited to, strengthening agents, foam (prepared from a suitable foaming agent), dispersants, polyphosphates (e.g., sodium trimetaphosphate), starches, retarders, accelerators, recalcination inhibitors, binders, adhesives, secondary dispersing aids, leveling or non-leveling agents, thickeners, bactericides, fungicides, pH adjusters, buffers, colorants, reinforcing materials, fire retardants, water repellants (for example siloxane), fillers, and mixtures thereof.

Additives and other components of the gypsum slurry may be added to the mixer in various ways. For example, various combinations of components may be pre-mixed before entering the mixer, either as one or more dry components and/or as one or more wet components. Singular components may similarly be introduced to the mixer in wet or dry form. If introduced in a wet form, the components may be included in a carrier fluid, such as water, in any suitable concentration.

Fibers can optionally be used in the methods and composition of the present invention. The fibers may include mineral fibers (also known as mineral wool), glass fibers, carbon fibers, and mixtures of such fibers, as well as other comparable fibers providing comparable benefits to the wallboard. For example, glass fibers can be incorporated in the gypsum low-density region slurry and/or the high-density region layer slurry and resulting crystalline core structure. The glass fibers in such aspects may have an average length of about 0.5 to about 0.75 inches and a diameter of about 11 to about 17 microns. In other aspects, such glass fibers may have an average length of about 0.5 to about 0.675 inches and a diameter of about 13 to about 16 microns. In yet other aspects, E-glass fibers are utilized having a softening point above about 800° C. or above at least about 900° C. Mineral wool or carbon fibers such as those known to those of ordinary skill may be used in place of or in combination with glass fibers.

Fibers, when included, can be present in the gypsum low density layer slurry and/or the gypsum high density layer slurry in amounts on a dry basis per 100 pbw of calcium sulfate hemihydrate of about 0.5 to about 10 pbw; preferably about 1 to about 8 pbw; more preferably about 2 to about 7 pbw; and most preferably about 3 to about 6 pbw. There may also be an absence of fibers.

Optionally, one or more phosphate-containing compounds can also be included in the slurry, if desired. For example, these phosphate-containing components can include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salts. Illustrative examples are described in U.S. Pat. Nos. 6,342,284; 6,632,550; 6,815,049; and 6,822,033, which are incorporated herein by reference in their entirety.

Phosphate-containing components can enhance green strength, resistance to permanent deformation (e.g., sag), dimensional stability, and the like. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is commonly used, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{N+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphates usually are added in a dry form and/or an aqueous solution liquid form, with the dry ingredients added to the slurry mixer, with the liquid ingredients added to the mixer, or in other stages or procedures.

When present, the phosphate can be included in the gypsum slurry in a dry form or in a form in water (e.g., a phosphate solution from about 5% to about 20%, such as about a 10% solution). If included, the phosphate can be present in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco. There may also be an absence of phosphate.

The gypsum slurry can optionally include at least one dispersant to enhance fluidity. The dispersant(s) may be introduced to the gypsum slurry in a dry form, optionally with other additives, and/or in a liquid form, optionally with other liquid components. Examples of suitable dispersants include naphthalene sulfonates, such as polynaphthalene sulfonic acid and its salts (polynaphthalenesulfonates) and derivatives, which are condensation products of naphthalenesulfonic acids and formaldehyde, as well as polycarboxylate dispersants, such as polycarboxylic ethers, for example. Other examples of suitable dispersants include lignosulfonates or sulfonated lignin. Lignosulfonates are water-soluble anionic polyelectrolyte polymers, which are byproducts from the production of wood pulp using sulfite pulping.

Lower molecular weight dispersants may be desirable. Lower molecular weight naphthalene sulfonate dispersants may be favored because they trend to a lower water demand than higher viscosity, higher molecular weight dispersants. Thus, molecular weights from about 3,000 to about 10,000 (e.g., about 8,000 to about 10,000) may be desirable molecular weights for a dispersant. If desired, the molecular weight of the polycarboxylate dispersants can be from about 20,000 to about 60,000, which may exhibit less retardation than dispersants having molecular weights above about 60,000.

Typical naphthalenesulfonates are a naphthalene sulfonate solution in water, having a range of about 35% to about 55% by weight naphthalenesulfonate solids content. However, if desired the naphthalenesulfonates can be used in dry solid or powder form.

When present, the dispersant can be included in the gypsum slurry in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, or the like. There may also be an absence of any one or more of polynaphthalenesulfonates, polycarboxylic ethers or lignosulfonates.

Accelerators and/or retarders may be added to the gypsum low density layer slurry and/or the high density layer slurry to modify the rate at which the calcium sulfate hemihydrate-hydration reactions take place. Suitable accelerators may include, for example, wet gypsum accelerator, heat resistant accelerator (HRA), or climate stabilized accelerator (CSA). "CSA" is a set accelerator including 95% calcium sulfate dihydrate co-ground with 5% sugar and heated to 250° F. (121° C.) to caramelize the sugar. CSA is made according to U.S. Pat. Nos. 3,573,947 and 6,409,825, herein incorporated by reference. Potassium sulfate is another preferred accelerator. HRA (Heat Resistant Accelerator), which is a preferred accelerator, is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators. When present, the accelerator and/or retarder each can be incorporated in the gypsum slurry in an amount on a solid basis of, e.g., about 0% to about 10% by weight of the stucco (e.g., about 0.1% to about 10%), such as, for example, from about 0% to about 5% by weight of the stucco (e.g., about 0.1% to about 5%). Suitable accelerators may include, for example, calcium sulfate dihydrate, carbohydrate-coated calcium sulfate, calcium sulfate dihydrate/organic phosphonate, and calcium sulfate dihydrate/organic phosphate. There may also be an absence of accelerators and/or retarders.

Foam (also known as foam water) may optionally be introduced into the gypsum low-density region slurry and/or the high-density region slurry (preferably the gypsum low-density region slurry) in amounts that provide the above mentioned reduced low-density region density and panel weight. The foaming agent to produce the foam is typically a soap or other suitable surfactant. The introduction of foam in the gypsum low-density region slurry in the proper amounts, formulations, and process will produce a desired network and distribution of voids within the low-density region of the final dried wallboards. This void structure permits the reduction of the gypsum and other low-density region constituents and the low-density region density and weight, while maintaining desired panel structural and strength properties. If present, foaming agents may comprise a major weight portion of unstable component and a minor weight portion of stable component (e.g., where unstable and blend of stable/unstable are combined). The weight ratio of unstable component to stable component is effective to form an air void distribution within the set gypsum low-density region, as described in U.S. Pat. Nos. 5,643,510; 6,342,284; and 6,632,550, which are incorporated herein by reference in their entirety. The approaches for adding foam to a gypsum low-density region slurry are known in the art and one example of such an approach is discussed in U.S. Pat. No. 5,683,635, the disclosure of which is incorporated by reference herein. Evaporative water voids, generally having voids of about 5 μm or less in diameter, also contribute to the total void distribution along with the aforementioned air (foam) voids. The volume ratio of voids with a pore size greater than about 5 microns to the voids with a pore size of about 5 microns or less, is from about 0.5:1 to about 9:1, such as, for example, about 0.7:1 to about 9:1, about 1.8:1 to about 2.3:1, or the like. The foaming agent is present in the gypsum slurry in an amount, for example, of less than about 0.5% by weight of the stucco, such as about 0.01% to about 0.5%, about 0.01% to about 0.2%, about 0.02% to about 0.4%, about 0.02% to about 0.2%, about 0.01% to about 0.1%, or the like. There may also be an absence of foaming agents.

Components for fire and/or water resistance can also be included in the gypsum slurry. Examples include, for instance, siloxanes (water resistance); fiber; heat sink additives such as aluminum trihydrite (ATH), magnesium hydroxide or the like; and/or high expansion particles (e.g., expandable to about 300% or more of original volume when heated for about one hour at 1560° F.). Further disclosure on such additives may be found in U.S. Pat. No. 8,323,785, which is incorporated by reference in its entirety. High expansion vermiculite may be included, although other fire resistant materials can be included. If present, fire or water resistance additives can be included in any suitable amount as desired depending, e.g., on fire rating, and like performance parameters. For example, if included, the fire or water resistance additives can be individually present in an amount from about 0.5% to about 10% by weight of the stucco, such as from about 1% to about 10%, about 1% to about 8%, about 2% to about 10%, about 2% to about 8%, or the like. If included, the siloxane may desirably be introduced in the form of an emulsion. The slurry may then be shaped and dried under conditions which promote the polymerization of the siloxane to form a highly crosslinked silicone resin. A catalyst which promotes the polymerization of the siloxane to form a highly crosslinked silicone resin can be added to the gypsum slurry. Solventless methyl hydrogen siloxane fluid can be used as the siloxane. This product is a siloxane fluid containing no water or solvents. It is contemplated that about 0.3% to about 1.0% of the siloxane may be used if desired, based on the weight of the dry ingredients. For example, if desired, about 0.4% to about 0.8% siloxane may be present in the gypsum slurry based on the dry stucco weight.

There may also be an absence of any one or more of these components for fire and/or water resistance. For example, there may be an absence of siloxane.

The polymer layer may have a substantial absence of gypsum for example less than 5 wt. % or less than 1 wt. % on a dry basis. The polymer layer may have an absence of gypsum.

The polymer layer may have a substantial absence of calcium carbonate for example less than 5 wt. % or less than 1 wt. % on a dry basis. The polymer layer may have an absence of calcium carbonate.

The polymer layer may have a substantial absence of magnesium carbonate for example less than 5 wt. % or less than 1 wt. % on a dry basis. The polymer layer may have an absence of magnesium carbonate.

The polymer layer may have a substantial absence of pigment for example less than 5 wt. % or less than 1 wt. % on a dry basis. The polymer layer may have an absence of pigment.

The polymer layer may have a substantial absence of calcium carbonate for example less than 5 wt. % or less than 1 wt. % on a dry basis. The polymer layer may have an absence of polyurea.

The polymer layer may have a substantial absence of solid filler for example less than 5 wt. % or less than 1 wt. % on a dry basis. The polymer layer may have an absence of solid filler.

The polymer layer may have a substantial absence of inorganic polymers for example less than wt. % or less than 1 wt. % on a dry basis. The polymer layer may have an absence of inorganic polymers.

The polymer layer may have a substantial absence of zeolite for example less than 5 wt. % or less than 1 wt. % on a dry basis. The polymer layer may have an absence of zeolite.

The polymer layer may have a substantial absence of borax for example less than 5 wt. % or less than 1 wt. % on a dry basis. The polymer layer may have an absence of borax.

Water

Water is added to the slurry in any amount that makes a flowable slurry. The amount of water to be used varies greatly according to the application with which it is being used, the exact dispersant being used, the properties of the calcium sulfate hemihydrate, and the additives being used.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The water can be present in the gypsum low-density region slurry and/or the high-density region layer slurry of the present invention at a weight ratio of water to calcium sulfate hemihydrate of about 0.2:1 to about 1.2:1; preferably, about 0.3:1 to about 1.1:1; more preferably, about 0.6:1 to about 1:1; most preferably 0.7:1 to 0.95:1; and typically about 0.85:1.

Back Paper Cover Sheet and the Front Paper Cover Sheet

The back paper cover sheet and the front cover sheet may be made from any suitable paper material having any suitable basis weight.

The back and front cover sheets are made of paper. However, the paper materials for each cover sheet may be the same or different.

Various paper grades can be used in gypsum panels, including Manila grade paper with a smooth calendared finish is often used as the facer paper cover sheet, and Newsline paper with a rougher finish is often used as the backer paper cover sheet. Typically both paper grades are multi-ply with at least one liner ply and several filler plies. However, if desired at least one paper cover sheet or both paper cover sheets are made of single-ply paper.

Typically a back cover sheet only covers the back surface. In contrast, a front cover sheet covers the front surface of the board and also wraps around the board edges to contact the back cover sheet.

If desired, to enhance strength (e.g., nail pull strength), especially for lower density gypsum boards, one or both of the cover sheets can be formed from paper having a basis weight of, for example, at least about 45 lbs/MSF (e.g., from about 45 lbs/MSF to about 65 lbs/MSF, about 45 lbs/MSF to about 60 lbs/MSF, about 45 lbs/MSF to about 55 lbs/MSF, about 50 lbs/MSF to about 65 lbs/MSF, about 50 lbs/MSF to about 60 lbs/MSF, or the like). If desired, the front paper cover sheet may have a higher basis weight than does the back cover sheet, which may provide enhanced nail pull resistance and handling. The back paper cover sheet can have a somewhat lower basis weight if desired (e.g., a basis weight of less than 45 lbs/MSF, e.g., from about 33 lbs/MSF to 45 lbs/MSF (e.g., about 33 lbs/MSF to about 40 lbs/MSF).

Optional Perforations

Figure 3:
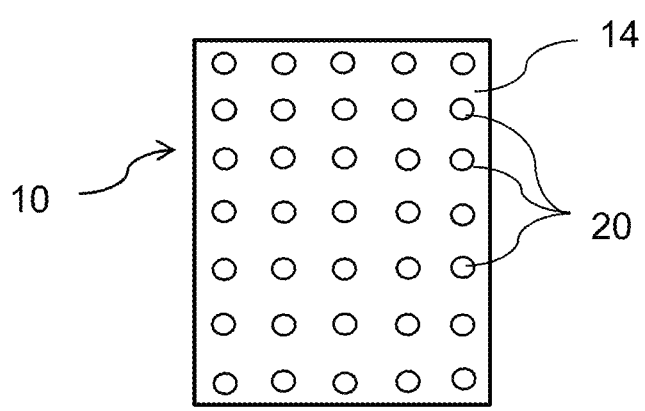
FIG. 3 shows a top (axial) view of the gypsum board of FIG. 1, in which the arrangement of the plurality of perforations in the back cover sheet can be better seen.

In addition, if desired, the back paper cover sheet may be a paper sheet which contains a plurality of perforations. FIG. 3 shows a top (axial) view of the wallboard panel 10, in which an illustrative configuration of perforations 20 may be seen within backer paper cover sheet 14. FIG. 3 shows the backer paper cover sheet (back cover sheet) 14 contains a plurality of the perforations 20 extending therethrough. As depicted, the perforations 20 are patterned in a regular array of columns and rows. It is to be appreciated that other patterned arrangements of perforations 20 also reside within the scope of the invention, and the depicted number, spacing and coverage density of the perforations 20 should not be considered limiting.

The perforations 20 within the backer paper cover sheet 14 increase the bonding performance between the gypsum low-density region 12 and the backer paper cover sheet 14. The improved bonding performance can be particularly evident when the gypsum used to form the gypsum low-density region 12 has a high salt concentration. Without being bound by theory or mechanism, it is believed that the perforations provide a conduit for outward migration of chloride salts released from the board core that would otherwise detrimentally aggregate at the interface between the board core and the cover sheets. Thus, perforation may offer a complementary mechanism to the polymer coating described herein for affecting improved adhesion. Illustrative equipment for perforating one or more of the cover sheets in gypsum board in a manner consistent with the present disclosure is described in U.S. Patent Application Publication 2018/0065336, which is incorporated herein by reference in its entirety.

The perforations in the back paper cover sheet may be present as a shape, size, and perforation density suitable to support drying and/or increased adhesion in the gypsum board.

Typically, the perforations have a substantially circular shape. It is to be appreciated, however, that the perforations may have alternative geometric shapes such as oval, triangular, square, rectangular, or the like. Any combination of circular and non-circular perforations may be present, depending on the requirements for a particular application. Any combination of non-circular perforations may be present.

Each of the perforations within the cover sheet(s), particularly the back cover sheet may define an opening having a size that ranges from about 0.005 inches to about 0.1 inches in its largest transverse dimension, preferably from about 0.01 inches to about 0.1 inches in size, and more preferably from about 0.01 inches to about 0.02 inches in size. The term "largest transverse dimension" represents the largest dimension measured across each perforation within the plane of the cover sheet(s). For circular perforations, the largest transverse dimension represents diameter of a circular opening.

The perforation coverage density refers to the number of perforations per unit area in the back cover sheet. The perforation density within the cover sheet(s) may be about 5 to about 50 perforations/in$^2$, preferably about 12 to about 25 perforations/in$^2$, for example about 10 to about 15 perforations/in$^2$, or for example about 15 to about 20 perforations/in$^2$.

If a perforated back paper cover sheet is employed, then in the method for making the gypsum board, when the foam and the slurry have been brought together, the resulting slurry moves toward and is poured onto a conveyor lined with a first piece of facing material which is the front paper cover sheet (facer paper cover sheet). Another piece of facing material which is the perforated back paper cover sheet (backer paper cover sheet) is placed on top of the slurry, forming a sandwich assembly with the slurry between the two facing materials.

Typically the perforations are 0.1 to 10%, more typically 0.5 to 5% of the surface of the back cover sheet.

The perforations may be patterned in a regular array of columns and rows. It is to be appreciated that other patterned arrangements of perforations also reside within the scope of the invention, and the depicted number, spacing and coverage density of the perforations should not be considered limiting.

Systems

Figure 4:
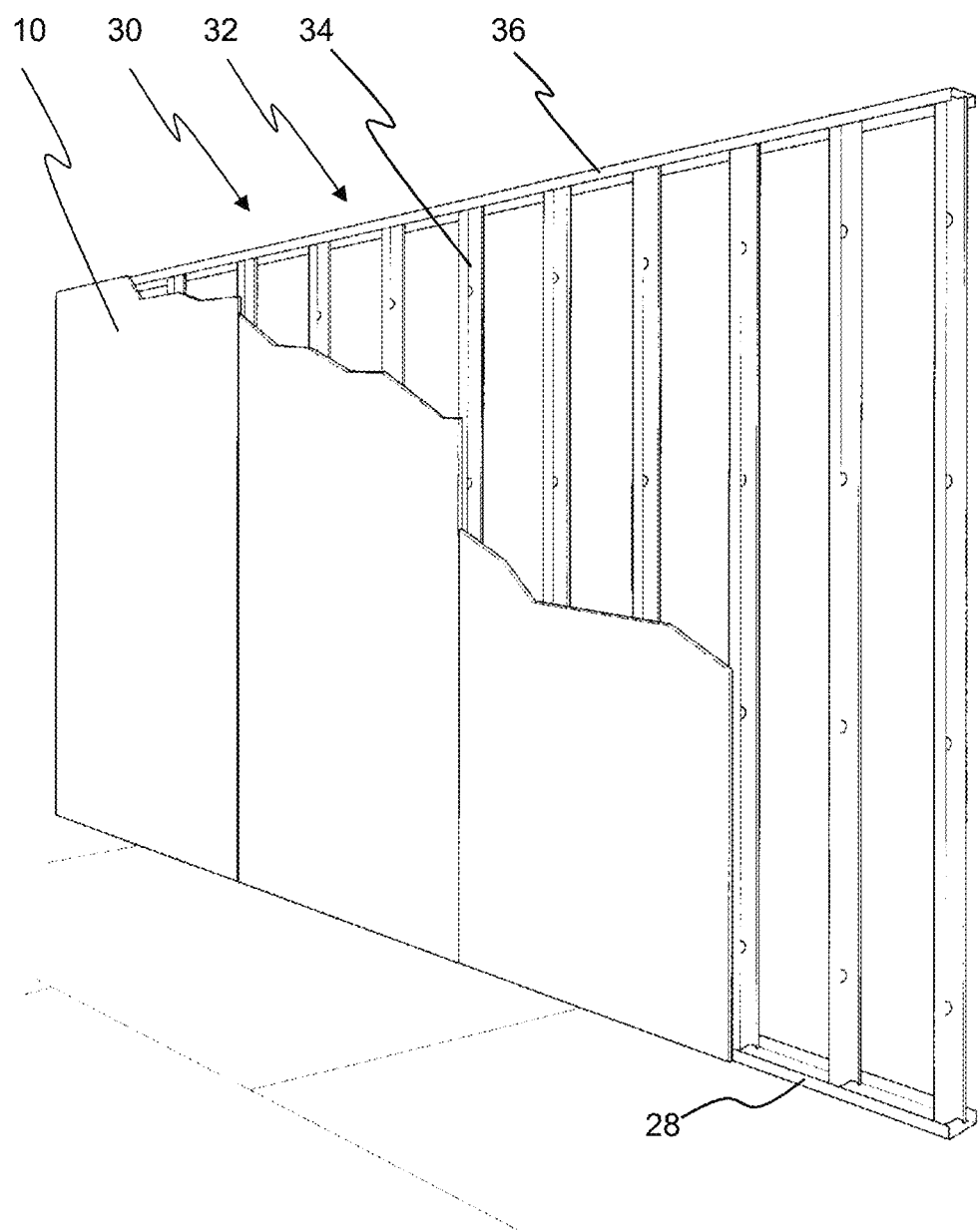
FIG. 4 shows a perspective view of a gypsum board of the present invention attached to one side of a metal stud wall suitable in a wall system of the present invention.

FIG. 4 is a perspective view of a typical building wall system 30 that may be employed in a wall system of the present invention. FIG. 4 shows metal stud wall "skeleton" 32 which includes a plurality of metal studs 34, an upper track 36, a lower track 38. Gypsum boards 10 (FIG. 1) may be secured in any known manner to one or both sides of the metal studs 34 to close the wall and form the interior surface or surfaces of the wall or a ceiling. A typical metal stud wall "skeleton" may be fabricated according to U.S. Pat. No. 6,694,695 to Collins et al., incorporated herein by reference, which is suitable for combination with an exterior sheathing panel to achieve a wall system of the present invention. This metal frame system is merely provided as illustrative as wood or other metal frames may also be employed.

The following examples further illustrate the invention but, of course, should not be construed as in any way limiting its scope.

Examples

Gypsum core (slurry) formulations with a high chloride concentration in the form of NaCl or MgCl$_2$ were prepared as specified in Table 1. Samples indicated as containing NaCl. All of the gypsum core formulations contained a small amount of accelerator (HRA) and starch. In Table 1 and other tables of the examples STMP is sodium trimetaphosphate.

Procedure:

12"×12"×½" gypsum wallboards were prepared by using the formula in Table 1 to make a foamed gypsum layer. The source of chloride anion (CO is sodium chloride (NaCl) and magnesium chloride (MgCl$_2$). In Table 1 and other tables of the examples ppm is relative to the weight of the calcium hemihydrate.

TABLE 1

Formula for the gypsum core.

| Gypsum Slurry | Control without STMP | Control | 1000 ppm NaCl | 2000 ppm NaCl—MgCl2 |
|---|---|---|---|---|
| Core ID | C0 | C1 | C2 | C3 |
| Thickness | ½" | ½" | ½" | ½" |
| Stucco (g) | 800 | 800 | 800 | 800 |
| HRA (g) | 8 | 8 | 8 | 8 |
| Starch (g) | 8 | 8 | 8 | 8 |
| NaCl (g) | | | 1.32 | 0.76 |
| MgCl2 (g) | | | | 0.85 |
| 10% STMP (g) | 0 | 8 | 8 | 8 |
| Retarder 1% (g) | 12 | 12 | 12 | 12 |
| Dispersant (g) | 3 | 3 | 3 | 3 |
| Gauge water (g) | 697 | 697 | 697 | 697 |
| Air (L/min) | 5 | 5 | 5 | 5 |
| Soap (lb/h) | 40 | 40 | 40 | 40 |
| Foam time (sec) | 11 | 11 | 11 | 11 |

12"×12"×½" envelopes were made by using Manila paper (46 #/msf) as a face paper and Newsline paper (40 #/msf) as a back paper.

Three types of as-received emulsions, RHOPLEX AC-1034, ROVENE 4546 and POLYCOL HP 42-1942, were diluted to the different concentration as shown in Table 2. RHOPLEX AC-1034 emulsion is a styrenated acrylic copolymer emulsion. It forms a coating of high water resistance. ROVENE 4546 is a styrene-butadiene emulsion polymer of medium to high stiffness. It dries to form a film of high water resistance. POLYCOL HP 42-1942 is a Styrene Acrylic Copolymer Emulsion having $T_g$: 22° C.

TABLE 2

Diluted emulsions

| Emulsion Type | RHOPLEX AC1034 | RHOPLEX AC1034 | ROVENE 4546 | HP 42-1942 |
|---|---|---|---|---|
| Coating ID | AC10 | AC20 | R20 | V20 |
| As-received polymer concentration (%) | 47.5% | 47.5% | 51-53% | 49-51% |
| Dilution % | 10% | 20% | 20% | 20% |
| Diluted concentration (%) | 4.75 | 9.5 | ~10.4 | ~10 |

Prior to pouring the slurry into the envelope, the diluted emulsions in Table 2 were brushed onto the core side of the back paper, as shown in Table 3 and Table 4.

TABLE 3

AC1034 polymer with the different concentration

| Board ID | #1 | #2 | #3 | #4 | #5 | #6 | #7 |
|---|---|---|---|---|---|---|---|
| Core ID | C0 | C0 | C1 | C1 | C2-1000 ppm NaCl | C2-1000 ppm NaCl | C2-1000 ppm NaCl |

TABLE 3-continued

AC1034 polymer with the different concentration

| Board ID | #1 | #2 | #3 | #4 | #5 | #6 | #7 |
|---|---|---|---|---|---|---|---|
| Coating ID | none | AC10 | none | AC10 | none | AC10 | AC20 |
| Calculated dried polymer (lb /msf) | 0 | 0.45 | 0 | 0.45 | 0 | 0.45 | 0.80 |

TABLE 4

Different types of the diluted emulsions

| Board ID | #8 | #9 | #10 | #11 | #12 |
|---|---|---|---|---|---|
| Core ID | C1 | C3-2000 ppm NaCl—MgCl2 | C3-2000 ppm NaCl—MgCl2 | C3-2000 ppm NaCl—MgCl2 | C3-2000 ppm NaCl—MgCl2 |
| Coating ID | none | none | AC20 | R20 | V20 |
| Calculated dried polymer (lb/msf) | 0 | 0 | 0.75 | 0.85 | 0.80 |

The slurry was prepared by soaking dry powders in the solution for 10 seconds and mixing for 10 seconds in a Hobart mixer, followed by injecting the foam for 10 seconds and mixing another 2 seconds. This forms a slurry for a low-density region. The slurry was poured into the 12"×12"×½" envelops. After the slurry was set and hardened, the envelop was sealed by using a paper tape. The sealed board was dried at 450° F. for 20 mins, then moved to 350° F. oven. After being dried at 350° F. for 15 mins, the board was further dried at 110° F. for overnight.

Four samples with the size of 5" in machine direction and 6" in cross direction were cut from each board. Make a ⅛" deep straight score parallel with the long direction of specimen and 2" from one edge. These scored samples was conditioned in an environment of 90° F. and 90% relative humidity. Two samples from each board were taken out of the environmental chamber after seven days and 14 days. The board core was snapped along the score without breaking or stressing the paper on the back side of the boards, and the larger piece of the board sample was then rotated and forced downward while the smaller piece was held stationary and horizontally with its face surface up, in an attempt to force the back paper on the back side of the board to peel away from the larger piece. The force was increased until the two pieces came completely apart, then recorded the peak load (referred to as Paper-to-Core humidified bond). After the sample failed, the sample was removed, and the back surface of the larger piece was then examined to determine on what percentage of its surface the back paper had pulled completely away from the core (referred to as "clean peel"). This percentage is reported in Table 3 and Table 4 as the "% Failure". Table 3 and Table 4 show that the layer of a thin coat on the core side of the back paper improves the paper-to-core bond in the environment of 90° F. and 90% relative humidity when the board contains high concentration of salt. While when the polymer is coated on the low salt board, the polymer coating does not improve the paper-to-core bond greatly, as seen in Table 5, Sample #1 vs. Sample #2.

TABLE 5

Humidified Bond and Failure percentage from the boards in Table 3.

| Board ID | | #1 | #2 | #3 | #4 | #5 | #6 | #7 |
|---|---|---|---|---|---|---|---|---|
| Board Weight (#/msf) | | 1322 | 1350 | 1359 | 1341 | 1352 | 1332 | 1348 |
| 7 day | Load (lbs) | 14.8 | 15.5 | 15.1 | 15.9 | 10.4 | 12.5 | 13.1 |
|  | % Failure | 0 | 0 | 0 | 0 | 35 | 5 | 5 |
| 14 days | Load (lbs) | 12.3 | 12.9 | 12.5 | 13.1 | 8.6 | 10.7 | 11.4 |
|  | % Failure | 0 | 0 | 0 | 0 | 45 | 10 | 5 |

TABLE 6

Humidified Bond and Failure percentage from the boards in Table 3.

| Board ID | | #8 | #9 | #10 | #11 | #12 |
|---|---|---|---|---|---|---|
| Board Weight (#/msf) | | 1356 | 1355 | 1374 | 1345 | 1362 |
| 7 day | Load (lbs) | 15.3 | 9.8 | 13.2 | 12.8 | 12.4 |
|  | % Failure | 0 | 45 | 5 | 10 | 10 |
| 14 days | Load (lbs) | 13.2 | 7.1 | 11.1 | 10.4 | 9.9 |
|  | % Failure | 0 | 55 | 5 | 5 | 10 |

The Examples show that a thin layer of the diluted emulsion on the core side of paper can improve the bond between paper and core.

Aspects of the invention:
1) Preferred polymer type: Styrene acrylic or Styrene butadiene emulsion polymer
2) Polymer usage: Dried polymer 0.2~3.0 lbs/MSF
3) Coat location: between the paper cover sheet and the gypsum slurry. Both front and back paper cover sheets or only back paper cover sheet.
4) Gypsum Chloride Concentration range: 300~3000 ppm The preceding are merely examples of the invention. It will be understood by one of ordinary skill in the art that each of these examples may be used in various combinations with the other aspects of the invention provided herein.

Clauses of the Invention

Various aspects of the present invention are described by the following clauses:

Clause 1. A gypsum board comprising:
a board core layer comprising set gypsum,
a front paper cover sheet having an outer surface and an inner surface, the inner surface contacting a first face of the board core; and
a back paper cover sheet having an outer surface and an inner surface, the inner surface facing a second face of the board core;
wherein the inner surface of the back paper cover sheet is coated with a polymer layer, wherein the polymer layer contacts the second face of the board core,
wherein about 0.2-about 3.0 lbs/msf, preferably about 1-about 2 lbs/msf, of the polymer layer is on the back paper cover sheet,
wherein the polymer layer comprises polymer selected from acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, preferably the polymer has a glass transition temperature ($T_g$) of $-10°$ C. to about 30° C.;
wherein the inner surface of the front paper cover sheet is not coated with a polymer layer, wherein no polymer layer contacts the first face of the board core,
wherein the polymer of the polymer layer does not penetrate through the back cover sheet to the outer surface of the back cover sheet,
wherein the core layer is between the first cover sheet and the second cover sheet,
wherein the board core comprises a low-density region and a high-density region, the high-density region being interposed as a layer between the low-density region and the front paper cover sheet, the high-density region having a higher density than the low-density region,
wherein there is an absence of a high-density region between the low-density region and the back cover sheet.
wherein the core layer resulted from setting, between the front paper cover sheet and the back paper cover sheet, an aqueous slurry comprising a mixture of water and stucco, wherein the stucco comprises calcium sulfate hemihydrate, wherein the aqueous slurry comprises:
at least 60 weight percent said calcium sulfate hemihydrate on a dry basis, about 150 to 4000 parts by weight chloride, typically about 300 to about 3000 parts by weight, more typically from about 400 to about 2000 parts by weight, further typically from about 1000 to about 2000 parts by weight, and further typically from about 600 to about 1000 parts by weight, chloride per 1,000,000 parts by weight said calcium sulfate hemihydrate, and said water at a weight ratio of water to the calcium sulfate hemihydrate of 0.2:1 to 1.2:1.

Clause 2. The gypsum board of Clause 1, wherein the polymer layer comprises styrene-butadiene latex, styrene acrylic polymer or acrylic ester polymer and combinations thereof.

Clause 3. The gypsum board of Clause 1, wherein the polymer layer comprises styrene-butadiene latex, styrene acrylic polymer or combinations thereof.

Clause 4. The gypsum board of any preceding Clause, wherein the polymer layer is a continuous polymer layer on the entire inner surface of the back paper cover sheet.

Clause 5. The gypsum board of any of Clauses 1 to 4, wherein the inner surface of the front paper cover sheet is coated with a second polymer layer, wherein the second polymer layer contacts the first face of the board core, wherein about 0.2-about 3.0 lbs/msf, preferably about 1-about 2 lbs/msf, of the second polymer layer is on the back paper cover sheet.

Clause 6. The gypsum board of any of Clauses 1 to 4, wherein a second polymer layer does not contact the front paper cover sheet.

Clause 7. The gypsum board of any preceding Clause, wherein the aqueous slurry comprises about 1000 parts by weight to about 3000 parts by weight chloride anion per 1,000,000 parts by weight said calcium sulfate hemihydrate.

Clause 8. The gypsum board of any preceding Clause, wherein the polymer layer has the glass transition temperature ($T_g$) of −10° C. to about 30° C. h.

Clause 9. The gypsum board of any preceding Clause, wherein the board core comprises the high-density region being is in direct contact with the low-density region and the front paper cover sheet.

Clause 10. The gypsum board of Clause 9, wherein the polymer layer results from drying and/or curing of an aqueous polymer composition comprising water and the polymer.

Clause 11. The gypsum board of any preceding Clause, wherein the low-density region is formed from a foamed gypsum slurry and comprises a plurality of voids therein.

Clause 12. The gypsum board of any preceding Clause, wherein the set gypsum is formed from synthetic gypsum comprising the one or more chloride salts.

Clause 13. The gypsum board of any preceding Clause, wherein the polymer layer has an absence of added surfactant, wherein the polymer layer results from drying and/or curing of an aqueous polymer composition consisting essentially of water and a latex or emulsion polymer.

Clause 14. The gypsum board of any preceding Clause, wherein the polymer layer has an absence of polyurethane.

Clause 15. The gypsum board of any preceding Clause, wherein no polymer layer contacts the high density region.

Clause 16. The gypsum board of any preceding Clause, wherein the high density region has an absence of polymer.

Clause 17. The gypsum board of any preceding Clause, having at least one of the following features:
  wherein the polymer layer has an absence of gypsum,
  wherein the polymer layer has an absence of calcium carbonate,
  wherein the polymer layer has an absence of magnesium carbonate,
  wherein the polymer layer has an absence of pigment,
  wherein the polymer layer has an absence of polyurea,
  wherein the polymer layer has an absence of solid filler,
  wherein the polymer layer has an absence of inorganic polymers,
  wherein the polymer layer has an absence of zeolite,
  wherein the polymer layer has an absence of borax.

Clause 18. The gypsum board of any preceding Clause, wherein the high-density region directly contacts the low-density region layer and the front paper cover sheet.

Clause 19. A method for making a gypsum board of any of Clauses 1 to 18 including a polymer layer comprising:
  preparing an aqueous gypsum slurry comprising a mixture of water and stucco, wherein the stucco comprises calcium sulfate hemihydrate, wherein the aqueous slurry comprises a mixture of:
    at least 60 wt. %, preferably at least 70 wt. %, more preferably at least 80 wt. %, typically at least 90 wt. % or typically at least 95 wt. % said calcium sulfate hemihydrate on a dry (water free) basis,
    150 to 4000 parts by weight chloride anion, typically about 300 to about 3000 parts by weight, more typically from about 400 to about 2000 parts by weight, further typically from about 1000 to about 2000 parts by weight, and further typically from about 600 to about 1000 parts by weight, chloride anion per 1,000,000 parts by weight said calcium sulfate hemihydrate, and
    the water at a weight ratio of water to the calcium sulfate hemihydrate of 0.2:1 to 1.2:1; and
  depositing a front paper cover sheet,
  depositing the aqueous gypsum slurry over the front paper cover sheet to form a layer of the aqueous gypsum slurry, wherein a side of the layer of aqueous gypsum slurry faces an inner surface of the front paper cover sheet,
  applying an aqueous mixture comprising polymer and water to an inner surface of a back paper cover sheet to result in about 0.2-about 3.0 lbs/msf, preferably about 1-about 2 lbs/msf, of a polymer-containing coating, on a dry (water-free) basis, to the inner surface of the back paper cover sheet, and
  then depositing the coated back cover sheet over the aqueous gypsum slurry, wherein the aqueous gypsum slurry contacts the polymer layer;
  wherein the polymer is selected from acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, preferably the polymer has a glass transition temperature ($T_g$) of −10° C. to about 30° C.,
  wherein the polymer of the polymer layer does not penetrate through the back cover sheet to the outer surface of the back cover sheet,
  wherein the inner surface of the front paper cover sheet is not coated with a polymer layer, wherein a first portion of the gypsum slurry is disposed in an unfoamed state as a high-density region in layer form contacting the front paper cover sheet and a second portion of the gypsum slurry is disposed in a foamed state as a low-density region contacting the high-density region, the high-density region having a higher density than the low-density region,
  setting the calcium sulfate hemihydrate to form a panel comprising a gypsum core comprising calcium sulfate dihydrate, wherein the board core comprises a set low-density region comprising calcium sulfate dihydrate and a set high-density region comprising calcium sulfate dihydrate, the set high-density region being interposed as a layer between the set low-density region and the front paper cover sheet,
  wherein there is an absence of a high-density region comprising calcium sulfate dihydrate between the low-density region and the back cover sheet; and
  drying the panel and cutting the panel into a gypsum board having one or more pre-determined dimensions.

Clause 20. The method of Clause 19, further comprising applying the polymer layer to the inner surface of the back paper cover sheet as a continuous polymer layer covering the entire inner surface of the back paper cover sheet.

Clause 21. The method of Clause 19 or 20, wherein the calcium sulfate hemihydrate comprises synthetic gypsum comprising the one or more chloride salts.

Clause 21. A wall system comprising framing to which is attached at least one gypsum board of any of Clauses 1-18, wherein the outer surface of the front paper cover sheet faces away from the framing.

Clause 22. The wall system of Clause 21, wherein the gypsum board is on an interior wall or ceiling of a building.

Clause 23. The wall system of Clause 21 or 22, wherein the framing is of wood or metal.

Clause 24. The wall system of any one of Clauses 21-23, wherein the at least one gypsum board is attached to the framing by any one or more of screws, nails, or glue.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. "Bonding relation" does not mean that two layers are in direct contact. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless otherwise indicated, all percentages, ratios, and average molecular weights are on a weight basis.

What is claimed is the following:

1. A gypsum board comprising:
a board core layer comprising set gypsum,
a front paper cover sheet having an outer surface and an inner surface, the inner surface contacting a first face of the board core; and
a back paper cover sheet having an outer surface and an inner surface, the inner surface facing a second face of the board core;
wherein the inner surface of the back paper cover sheet is coated with a polymer layer, wherein the polymer layer contacts the second face of the board core,
wherein about 0.2-about 3.0 lbs/msf of the polymer layer is on the back paper cover sheet,
wherein the polymer layer comprises polymer selected from acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof;
wherein the inner surface of the front paper cover sheet is not coated with a polymer layer, wherein no polymer layer contacts the first face of the board core,
wherein the polymer of the polymer layer does not penetrate through the back paper cover sheet to the outer surface of the back paper cover sheet,
wherein the core layer is between the first paper cover sheet and the second paper cover sheet,
wherein the board core comprises a low-density region and a high-density region, the high-density region being interposed as a layer between the low-density region and the front paper cover sheet, the high-density region having a higher density than the low-density region,
wherein there is an absence of a high-density region between the low-density region and the back paper cover sheet,
wherein the core layer resulted from setting, between the front paper cover sheet and the back paper cover sheet, an aqueous slurry comprising a mixture of water and stucco, wherein the stucco comprises calcium sulfate hemihydrate, wherein the aqueous slurry comprises:
at least 60 weight percent said calcium sulfate hemihydrate on a dry basis, about 150 to 4000 parts by weight chloride per 1,000,000 parts by weight said calcium sulfate hemihydrate, and
said water at a weight ratio of water to the calcium sulfate hemihydrate of 0.2:1 to 1.2:1.

2. The gypsum board of claim 1, wherein the polymer layer comprises polymer selected from styrene acrylics, acrylic esters, styrene-butadiene, and combinations thereof.

3. The gypsum board of claim 1, wherein the polymer layer comprises polymer selected from styrene acrylics, styrene-butadiene latex, and combinations thereof.

4. The gypsum board of claim 1, wherein the polymer layer is a continuous polymer layer on the entire inner surface of the back paper cover sheet.

5. The gypsum board of claim 1, wherein about 1-about 2 lbs/msf of the second polymer layer is on the back paper cover sheet.

6. The gypsum board of claim 1, wherein a second polymer layer does not contact the front paper cover sheet.

7. The gypsum board of claim 1, wherein the aqueous slurry comprises about 1000 parts by weight to about 3000 parts by weight chloride per 1,000,000 parts by weight said calcium sulfate hemihydrate.

8. The gypsum board of claim 1, wherein the polymer layer has a glass transition temperature (Tg) of −10° C. to about 30° C.

9. The gypsum board of claim 1, wherein the board core comprises the high-density region being is in direct contact with the low-density region and the front paper cover sheet.

10. The gypsum board of claim 9, wherein the polymer layer results from drying and/or curing of an aqueous polymer composition comprising water and the polymer.

11. The gypsum board of claim 1, wherein the low-density region is formed from a foamed gypsum slurry and comprises a plurality of voids therein.

12. The gypsum board of claim 1, wherein the set gypsum is formed from synthetic gypsum comprising the one or more chloride salts.

13. The gypsum board of claim 1, wherein the polymer layer has an absence of added surfactant, wherein the polymer layer results from drying and/or curing of an aqueous polymer composition consisting essentially of water and a latex or emulsion polymer.

14. The gypsum board of claim 1, wherein the high density region has an absence of polymer.

15. The gypsum board of claim 1, having at least one of the following features:
wherein the polymer layer has an absence of gypsum,
wherein the polymer layer has an absence of calcium carbonate,
wherein the polymer layer has an absence of magnesium carbonate,
wherein the polymer layer has an absence of pigment,
wherein the polymer layer has an absence of polyurea,
wherein the polymer layer has an absence of solid filler,
wherein the polymer layer has an absence of inorganic polymers,
wherein the polymer layer has an absence of zeolite,
wherein the polymer layer has an absence of borax.

16. The gypsum board of claim 1, wherein the high-density region directly contacts the low-density region layer and the front paper cover sheet.

17. A method for making a gypsum board of claim 1 including a polymer layer comprising:
preparing an aqueous gypsum slurry comprising a mixture of water and stucco, wherein the stucco comprises calcium sulfate hemihydrate, wherein the aqueous slurry comprises a mixture of:
at least 60 wt. % said calcium sulfate hemihydrate on a dry (water free) basis,
150 to 4000 parts by weight chloride anion per 1,000,000 parts by weight said calcium sulfate hemihydrate, and
the water at a weight ratio of water to the calcium sulfate hemihydrate of 0.2:1 to 1.2:1; and
depositing a front paper cover sheet,
depositing the aqueous gypsum slurry over the front paper cover sheet to form a layer of the aqueous gypsum slurry, wherein a side of the layer of aqueous gypsum slurry faces an inner surface of the front paper cover sheet,
applying an aqueous mixture comprising polymer and water to an inner surface of a back paper cover sheet to result in about 0.2-about 3.0 lbs/msf of a polymer-containing coating, on a dry (water-free) basis, to the inner surface of the back paper cover sheet, and
then depositing the coated back paper cover sheet over the aqueous gypsum slurry, wherein the aqueous gypsum slurry contacts the polymer layer;
wherein the polymer is selected from acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof,
wherein the polymer of the polymer layer does not penetrate through the back paper cover sheet to the outer surface of the back paper cover sheet,
wherein the inner surface of the front paper cover sheet is not coated with a polymer layer, wherein a first portion of the gypsum slurry is disposed in an unfoamed state as a high-density region in layer form contacting the front paper cover sheet and a second portion of the gypsum slurry is disposed in a foamed state as a low-density region contacting the high-density region, the high-density region having a higher density than the low-density region,
setting the calcium sulfate hemihydrate to form a panel comprising a gypsum core comprising calcium sulfate dihydrate, wherein the board core comprises a set low-density region comprising calcium sulfate dihydrate and a set high-density region comprising calcium sulfate dihydrate, the set high-density region being interposed as a layer between the set low-density region and the front paper cover sheet,
wherein there is an absence of a high-density region comprising calcium sulfate dihydrate between the low-density region and the back paper cover sheet; and
drying the panel and cutting the panel into a gypsum board having one or more pre-determined dimensions.

18. The method of claim 17, further comprising applying the polymer layer to the inner surface of the back paper cover sheet as a continuous polymer layer covering the entire inner surface of the back paper cover sheet.

19. A wall system comprising framing to which is attached at least one gypsum board of claim 1, wherein the outer surface of the front paper cover sheet faces away from the framing.

20. The wall system of claim 19, wherein the gypsum board is on an interior wall or ceiling of a building.

* * * * *